(12) United States Patent
Bleyer et al.

(10) Patent No.: US 10,535,151 B2
(45) Date of Patent: Jan. 14, 2020

(54) DEPTH MAP WITH STRUCTURED AND FLOOD LIGHT

(71) Applicant: Microsoft Technology Licensing, LLC, Redmond, WA (US)

(72) Inventors: Michael Bleyer, Seattle, WA (US); Raymond Kirk Price, Redmond, WA (US); Denis C. Demandolx, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 50 days.

(21) Appl. No.: 15/683,670

(22) Filed: Aug. 22, 2017

(65) Prior Publication Data

US 2019/0066315 A1   Feb. 28, 2019

(51) Int. Cl.
| | | |
|---|---|---|
| *G06T 7/49* | (2017.01) | |
| *G06T 7/11* | (2017.01) | |
| *G06T 7/521* | (2017.01) | |
| *G06T 7/586* | (2017.01) | |

(52) U.S. Cl.
CPC ............ *G06T 7/49* (2017.01); *G06T 7/11* (2017.01); *G06T 7/521* (2017.01); *G06T 7/586* (2017.01)

(58) Field of Classification Search
CPC ................ G06T 7/49; G06T 7/11
See application file for complete search history.

(56) References Cited

U.S. PATENT DOCUMENTS

| | | |
|---|---|---|
| 6,549,288 B1 | 4/2003 | Migdal et al. |
| 7,095,002 B2 | 8/2006 | Kong et al. |
| 7,206,449 B2 | 4/2007 | Raskar et al. |
| 9,234,749 B2 | 1/2016 | Gu |
| 9,280,829 B1 | 3/2016 | Lewis et al. |
| 9,361,698 B1 * | 6/2016 | Song ................. G06T 7/521 |
| 2004/0210427 A1 | 10/2004 | Marschner et al. |
| 2005/0219552 A1 | 10/2005 | Ackerman et al. |
| 2007/0242269 A1 | 10/2007 | Trainer |
| 2009/0167843 A1 | 7/2009 | Izzat et al. |

(Continued)

FOREIGN PATENT DOCUMENTS

| | | |
|---|---|---|
| WO | 2015097149 A1 | 7/2015 |
| WO | 2016160930 A1 | 10/2016 |

(Continued)

OTHER PUBLICATIONS

"International Search Report and Written Opinion Issued in PCT Application No. PCT/US18/038693", dated Sep. 28, 2018, 13 Pages.

(Continued)

*Primary Examiner* — Qian Yang
(74) *Attorney, Agent, or Firm* — Alleman Hall Creasman & Tuttle LLP

(57) ABSTRACT

A method including receiving an image of a scene illuminated by both a predetermined structured light pattern and a flood fill illumination, generating an active brightness image of the scene based on the received image of the scene including detecting a plurality of dots of the predetermined structured light pattern, and removing the plurality of dots of the predetermined structured light pattern from the active brightness image, and generating a depth map of the scene based on the received image and the active brightness image.

18 Claims, 21 Drawing Sheets

(56) References Cited

U.S. PATENT DOCUMENTS

| | | |
|---|---|---|
| 2010/0182406 A1 | 7/2010 | Benitez |
| 2011/0025827 A1 | 2/2011 | Kilian et al. |
| 2012/0194665 A1 | 8/2012 | Kilian et al. |
| 2013/0100256 A1 | 4/2013 | Kirk et al. |
| 2013/0215235 A1 | 8/2013 | Russell |
| 2013/0343634 A1 | 12/2013 | Xu et al. |
| 2015/0092258 A1 | 4/2015 | Herschbach et al. |
| 2015/0149303 A1 | 5/2015 | Spering |
| 2015/0256813 A1 | 9/2015 | Dal mutto et al. |
| 2015/0341619 A1 | 11/2015 | Meir et al. |
| 2016/0196657 A1 | 7/2016 | Kantor et al. |
| 2016/0225164 A1* | 8/2016 | Tomlin .................. G06T 15/04 |
| 2016/0260223 A1 | 9/2016 | Gren et al. |

FOREIGN PATENT DOCUMENTS

| | | |
|---|---|---|
| WO | 2017009324 A1 | 1/2017 |
| WO | 2017014691 A1 | 1/2017 |
| WO | 2018132271 A1 | 7/2018 |

OTHER PUBLICATIONS

"International Search Report and Written Opinion Issued in PCT Application No. PCT/US18/038680", dated Sep. 17, 2018, 10 Pages.

Rittler, et al., "Structured-light-based Depth Reconstruction Using Low-light Pico Projector", In Proceedings of the 13th International Conference on Advances in Mobile Computing and Multimedia, Dec. 11, 2015, 4 pages.

Moreno-Noguer, et al., "Active Refocusing of Images and Videos", In Journal of ACM Transactions on Graphics, vol. 26, Issue 3, Jul. 29, 2007, 9 pages.

Savarese, et al., "3D depth recovery with grayscale structured lighting", In Technical Report, Computer Vision, California Insititute of Technology, 1998, pp. 1-10.

Scharstein, et al., "A taxonomy and evaluation of dense two-frame stereo correspondence algorithms", In International Journal of Computer Vision, vol. 47 Issue 1-3, Apr. 2002, pp. 1-35.

Yoon, et al., "Adaptive support-weight approach for correspondence search", In Journal of IEEE Transactions on Pattern Analysis and Machine Intelligence, vol. 28, Issue 4, Apr. 2006, pp. 650-656.

Rhemann, et al., "Fast Cost-Volume Filtering for Visual Correspondence and Beyond", In Proceedings of IEEE Conference on Computer Vision and Pattern Recognition, Jun. 20, 2011, pp. 3017-3024.

Fanello, et al., "HyperDepth: Learning Depth from Structured Light Without Matching", In Proceedings of the IEEE Conference on Computer Vision and Pattern Recognition, Jun. 2016, pp. 5441-5450.

"Non Final Office Action Issued in U.S. Appl. No. 15/683,686", dated Mar. 14, 2019, 22 Pages.

"Final Office Action Issued in U.S. Appl. No. 15/683,686", dated Jul. 8, 2019, 20 Pages.

* cited by examiner

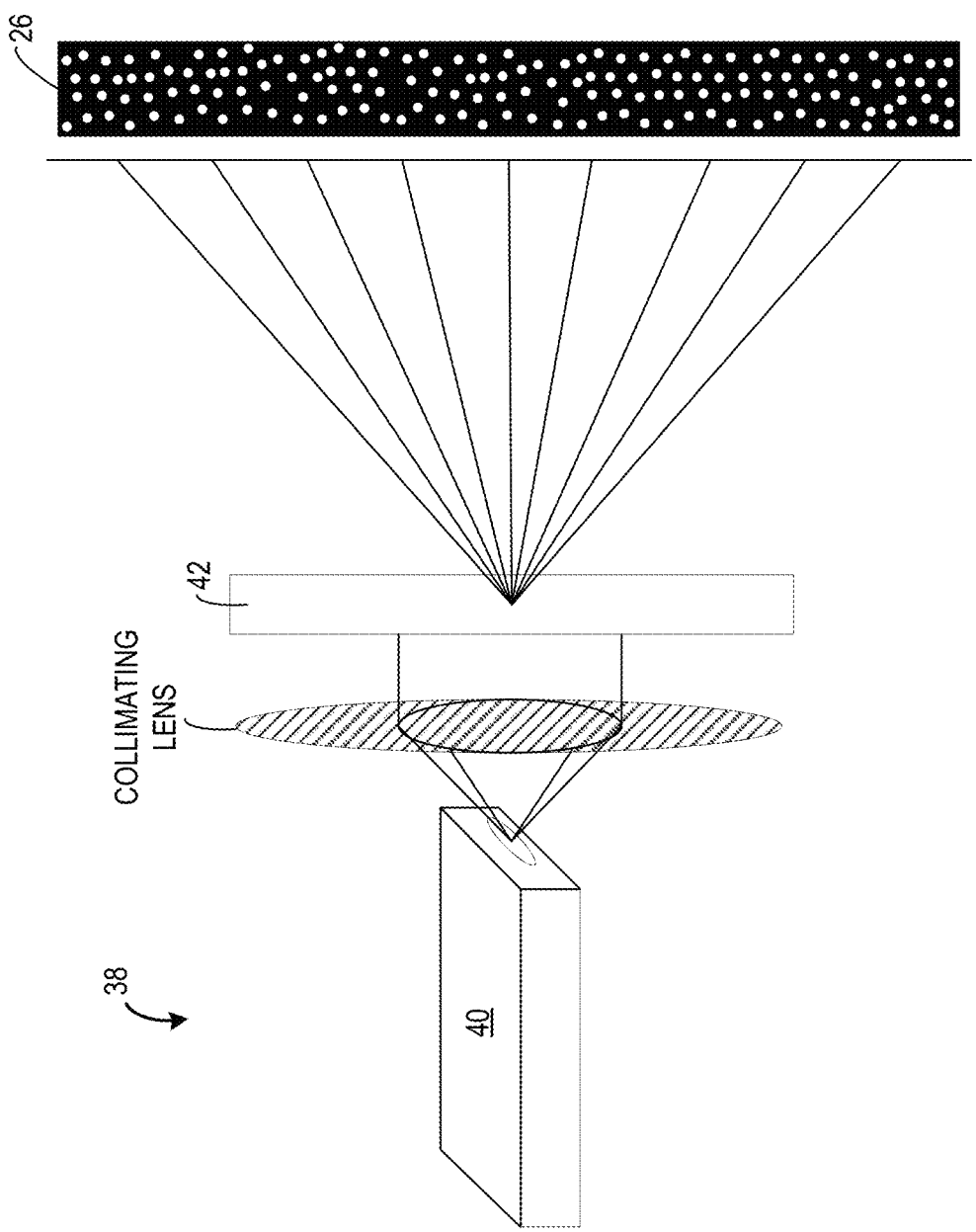

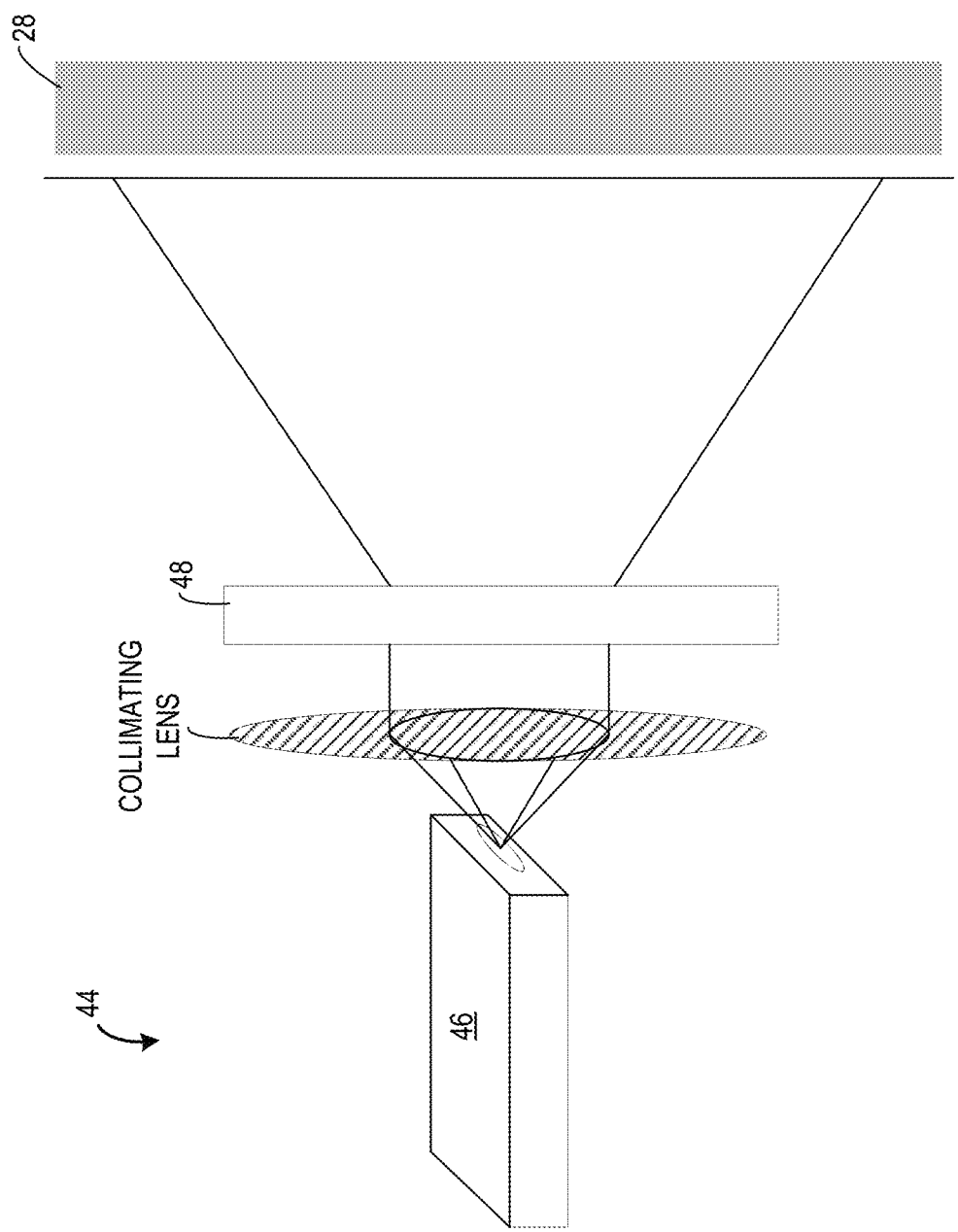

DEPTH MAP WITH STRUCTURED AND FLOOD LIGHT

BACKGROUND

Conventional structured light depth sensing systems typically project random dot patterns that provide sufficient texture to enable stereo matching between the camera image and the prerecorded dot pattern image.

SUMMARY

A method is provided, including receiving an image of a scene illuminated by both a predetermined structured light pattern and a flood fill illumination, generating an active brightness image of the scene based on the received image of the scene including detecting a plurality of dots of the predetermined structured light pattern, and removing the plurality of dots of the predetermined structured light pattern from the active brightness image, and generating a depth map of the scene based on the received image and the active brightness image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows an example structured light illuminator of the depth sensor of the computing device of FIG. 1.

FIG. 6 shows an example flood fill light illuminator of the depth sensor of the computing device of FIG. 1.

DETAILED DESCRIPTION

As discussed above, conventional structured light depth sensing systems typically project dot patterns that provide sufficient texture to enable stereo matching between the camera image and the prerecorded dot pattern image. However, in these structured light depth sensing systems, pixels that do not observe a dot do not receive any illumination. As a consequence of this missing input, current dot-based structured light depth maps typically have inaccurately reconstructed depth boundaries. The systems and methods described herein have been devised to address these challenges.

Figure 1:
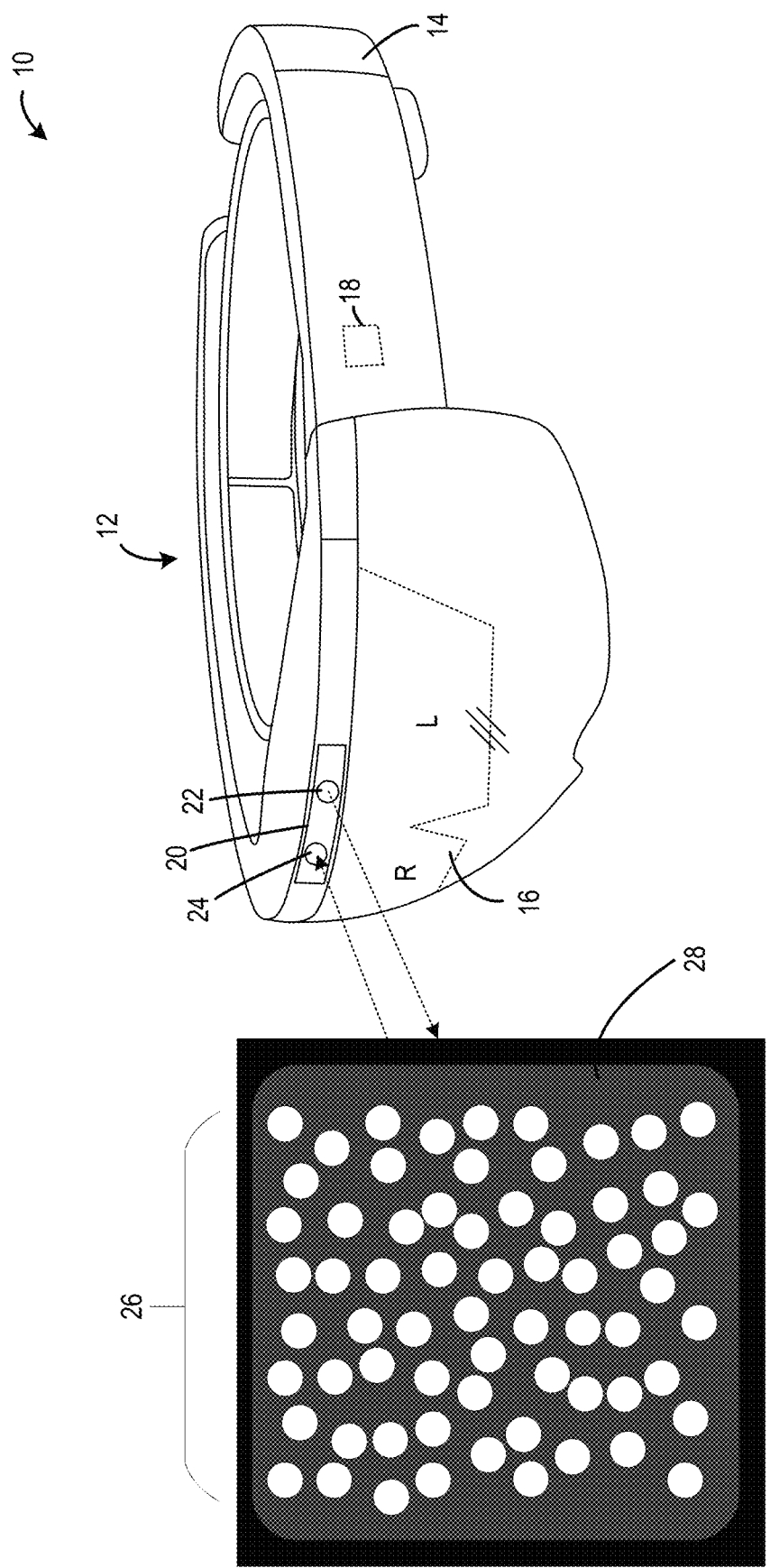
FIG. 1 shows a side perspective view of a computing device in the form of a head mounted display (HMD) device, according to one embodiment of the present disclosure.

FIG. 1 illustrates a computing device 10 in the form of a head mounted display (HMD) device 12. The HMD device 12 may be worn by a user according to an example of the present disclosure. In other examples, the computing device 10 may take other suitable forms, such as, for example, a desktop computing device, a gaming console, a laptop, a wrist mounted computing device, or a mobile computing device.

In the example of FIG. 1, the HMD device 12 includes a frame 14 that wraps around the head of the user to position a display device 16 close to the user's eyes. The frame supports additional components of the HMD device 10, such as, for example, a processor 18 and a depth sensor 20. The depth sensor 20 may be configured to generate depth maps of a physical environment in front of the depths sensor 20 of the HMD device 12.

In one example, the depth sensor 20 includes one or more illuminators 22 and one or more cameras 24. The processor 18 includes logic and associated computer memory configured to provide image signals to the display device 16, to receive images from the one or more camera 24, and to enact various control processes described herein. For example, the processor 18 may include a logic processor and the computing device 10 may include volatile memory and non-volatile storage, as discussed in more detail below with respect to the example computing system 100 of FIG. 21, in communication with the display device 16 and the depth sensor 20.

As illustrated in FIG. 1, the depth sensor 20 includes an illuminator 22 configured to emit both a predetermined structured light pattern 26 and a flood fill illumination 28 on a scene, such as, for example, a physical environment in front of the HMD device 12 worn by a user. In the illustrated example, the emitted predetermined structured light pattern 26 is a dot based speckle pattern. The dots of a typical structured light pattern are typically small points of light and may, for example, have a diameter of one or two pixels when impinging on a light sensor of a camera 24 within the depth sensor 20 after being reflected back to the depth sensor 20. Additionally, the typical structured light pattern may include one of these dots for every 25 camera pixels. However, it will be appreciated that any suitable size of dot and dot to camera pixel density in the predetermined structured light pattern 26 may be utilized to achieve a suitable performance and accuracy, such as, dot diameters of 2, 3, or 4 pixels, and dot densities of 1 dot for every 4, 9, 16, 25, or 36 camera pixels. Additionally, as illustrated in FIG. 1, the dots of the structured light pattern are typically not placed in a uniform grid pattern. The particular pattern of dots for the predetermined structured light pattern may be generated such that each region of interest (i.e., block) encompassing one or more dots will be detectable different than each other region of interest (i.e., block). The textured provided by the pattern of dots may be used by the processor 18 to perform stereo matching between regions of interest in the predetermined structured light pattern emitted by the illuminator 22 and corresponding regions of interest in the image captured by the camera 24. It will be appreciated that the predetermined structured light pattern 26 described above and illustrated in FIG. 1 is merely exemplary, and that the predetermined structured light pattern 26 may take other suitable forms.

As further illustrated in FIG. 1, the emitted flood fill illumination 28 is a diffuse illumination that typically has a uniform intensity when emitted. Additionally, as illustrated in FIG. 1, the flood fill illumination 28 is emitted with a lower intensity of light compared to the emitted predetermined structured light pattern 26. In one example, the flood fill illumination 28 may be emitted with an a tenth, an eighth, a quarter, or half the intensity as the predetermined structured light pattern 26. However, it will be appreciated that other ratios of intensity between the flood fill illumination 28 and the predetermined structured light pattern 26 may be utilized by the illuminator 22.

The depth sensor 20 further includes a camera 24 configured to capture an image of the scene illuminated by the predetermined structured light pattern 26 and the flood fill illumination 28. In one example, the illuminator 22 is configured to emit both the predetermined structured light pattern 26 and the flood fill illumination 28 concurrently, and the camera 24 is configured to capture an image of the scene that is concurrently being illuminated by both the predetermined structured light pattern 26 and the flood fill illumination 28. In another example, the illuminator 22 is configured to sequentially emit the predetermined structured light pattern 26 and the flood fill illumination 28, and the camera 24 is configured to captured at least two images, one image of the scene illuminated by the predetermined structured light pattern 26 and a second image of the scene illuminated by the flood fill illumination 28.

The one or more images of the scene captured by the camera 24 are received by the processor 18 that is configured to generate a depth map for the scene based on the image including both the predetermined structured light pattern 26 and the flood fill illumination 28. The processor 18 may be configured to generate the depth map for the scene using a suitable structured light depth map method, such as, for example, a block or patch matching algorithm. However, it will be appreciated that any suitable structured light depth map algorithm may be utilized to generate a depth map using the images captured by camera 24 of the depth sensor 20.

Figure 2C:
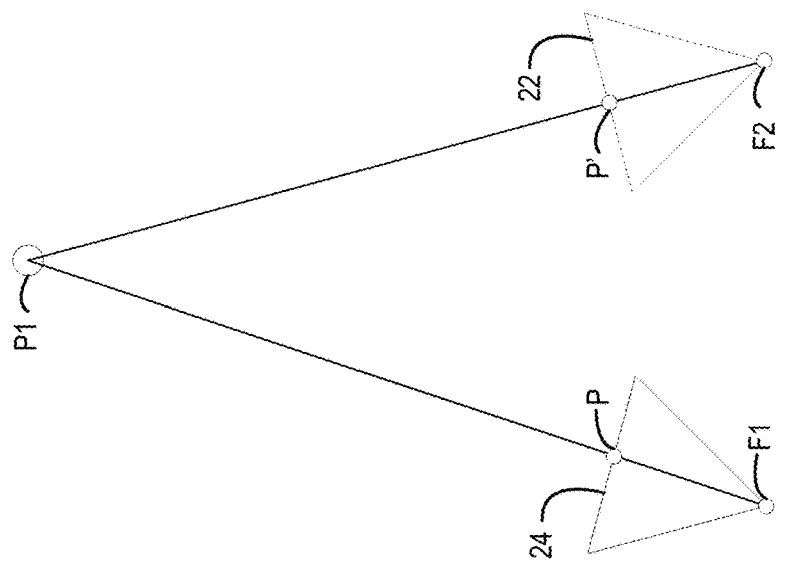
FIG. 2C shows an example depth calculation using the depth sensor of the computing device of FIG. 1.
Figure 2B:
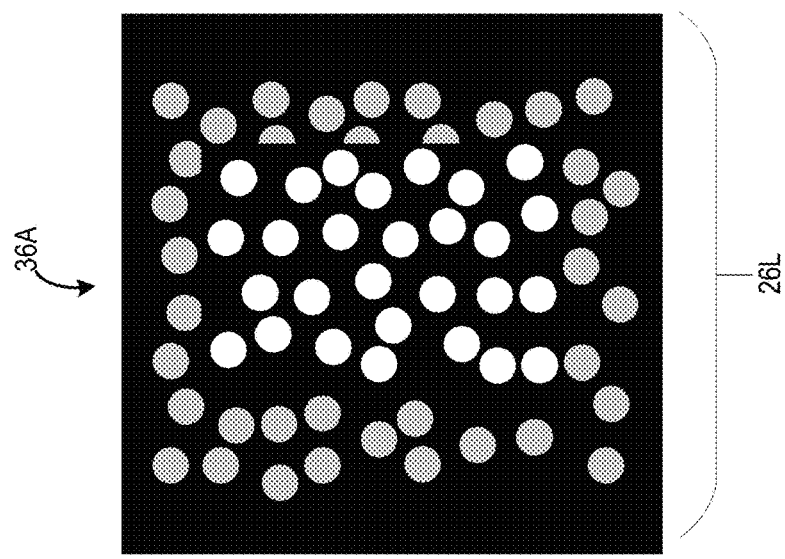
FIG. 2B shows an example image of the example scene illuminated by a predetermined structured light pattern captured by the depth sensor of the computing device of FIG. 1.
Figure 2A:
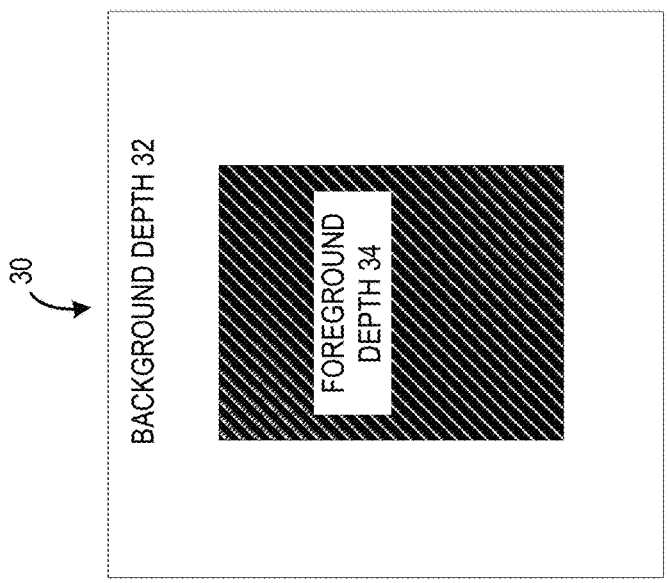
FIG. 2A shows an example scene being captured by the depth sensor of the computing device of FIG. 1.

FIG. 2A illustrates an example scene 30 including a background depth 32 and a foreground depth 34. In this example, the foreground depth 34 is a rectangular object that is closer to the HMD device 12 than the background depth 32, which, for example, may be a wall, table, another object, etc. As discussed previously, the illuminator 22 of the depth sensor 20 projects a predetermined structured light pattern 26 onto the example scene 30, and the camera 24 captures an image of the example scene 30 illuminated by the predetermined structured light pattern 26.

FIG. 2B illustrates an example image 36A of the example scene 30 illuminated by only the predetermined structured light pattern 26. In FIG. 2B, the size of the dots are exaggerated for ease of illustration. As show, the example image 36A includes an imaged predetermined structured light pattern 26L, which is the emitted predetermined structured light pattern 26 reflected off the example scene 30 and received by the camera 24. Due to the camera 24 being spaced away from the illuminator 22, the imaged predetermined structured light pattern 26L includes dots that have different imaged locations compared to corresponding dots in the emitted predetermined structured light pattern 26. The binocular disparity between corresponding dots is larger for dots reflected off foreground objects that are closer to the depth sensor 20, and smaller for dots reflected off background objects that are farther away from the depth sensor 20.

As illustrated in FIG. 2C, in one structured light depth map algorithm, the processor 18 may be configured to calculate depths in scene based on binocular disparities between dots of the emitted structured light pattern 26 emitted from the location of the illuminator 22 and the imaged structured light pattern 26L viewed from the location of the camera 24. As discussed previously, the dot-based predetermined structured light pattern emitted by the illuminator 22 casts rich texture onto the scene, which may be used by the processor 18 to perform stereo matching between regions of interest. In one example structured light depth map algorithm, the reference image of a stereo pair is the image of the scene captured by the camera 24. The second image of the stereo pair is a virtual one that shows what the illuminator 22 would see if it was a camera. It will be appreciated that this virtual image remains constant regardless of the scene content and can be prerecorded. That is, the virtual image is the predetermined structured light pattern emitted from the illuminator 22. In one example algorithm, for each pixel P of the reference view imaged by the camera 24, the processor 18 is configured to determine a corresponding pixel P' in the second view of a virtual camera at the location of the illuminator 22 via a suitable stereo matching algorithm. The processor 18 calculates the corresponding 3D point P1 by intersecting the ray F1P, where F1 is the focal point of the camera 24, with the ray F2P, where F2 is the focal point of the virtual camera at the location of the illuminator 24.

Figure 3:
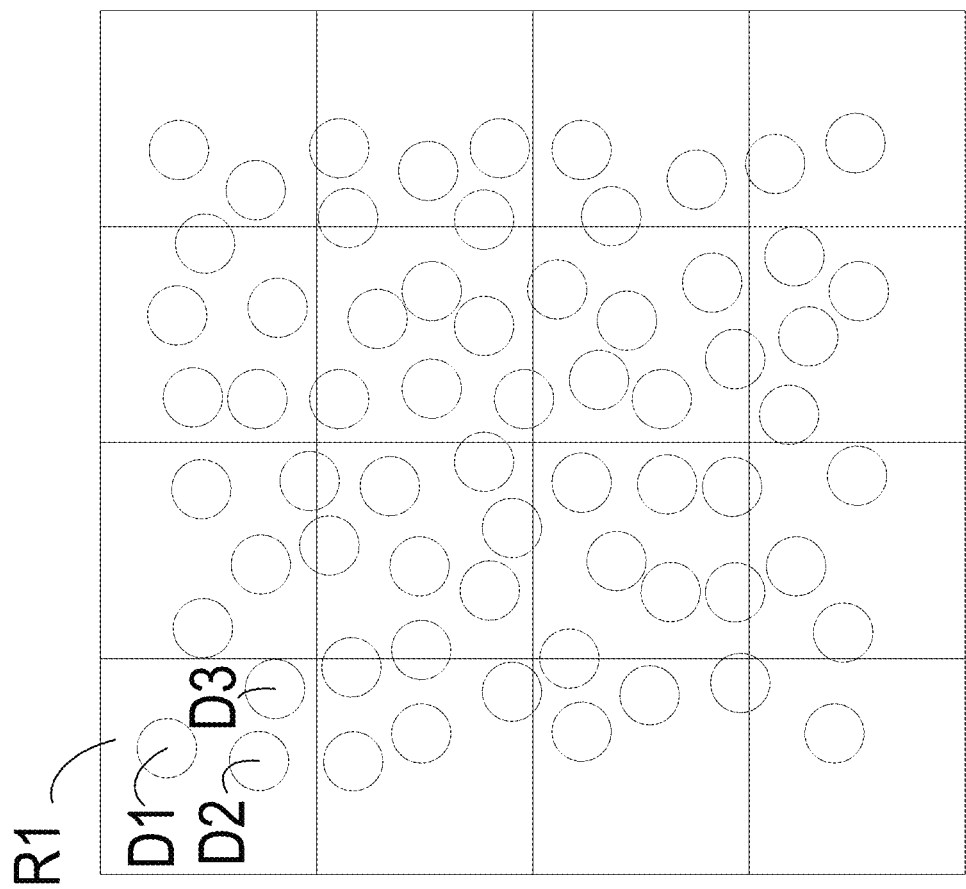
FIG. 3 shows example regions of interest for images captured by the depth sensor of the computing device of FIG. 1.

In one example, the processor 18 performs stereo matching for regions of interest. FIG. 3 illustrates sixteen regions of interest including a first region of interest R1. As shown, the first region of interest R1 includes an arrangement of three dots D1, D2, and D3 having particular locations in the first region of interest R1 and particular distances from each other dot in the first region of interest R1. As shown, the particular arrangement of dots in the first region of interest R1 is different than the arrangement of dots in each other region of interest. In this manner, the texture provided by the predetermined structured light pattern 26 provides each region of interest with different and detectable arrangements of dots. Thus, in one example, the processor 18 may be configured to perform stereo matching between regions of interest in the reference image captured by the camera 24 and regions of interest in the prerecorded virtual image based on the detected arrangements of dots within the regions of interest. After determining corresponding regions of interest, the processor 18 may be configured to calculate a depth value for each region of interest in the reference image according to the method described above with reference to FIG. 2C. It will be appreciated that FIG. 3 depicts sixteen regions of interest for illustrative purposes, and that typically the processor 18 may be configured to process any suitable number of regions of interest. Typically, the processor 18 may process hundreds of regions of interest when generating a depth map for each reference image captured by the camera 24. For example, each region of interest may be a 5 by 5 pixel region. In another example, each region of interest may be a 25 by 25 pixel region. The size of the region of interest may be selected to achieve a suitable balance between performance and accuracy of the depth map.

Turning back to FIG. 2B, areas between the dots of the predetermined structured light pattern 26 typically do not receive illumination from the emitted predetermined structured light pattern 26. Thus, accurate depth data for edges of the objects in the scene that lie between dots of the predetermined structured light pattern 26 may be difficult to calculate based on only the predetermined structured light pattern 26.

Figure 4B:
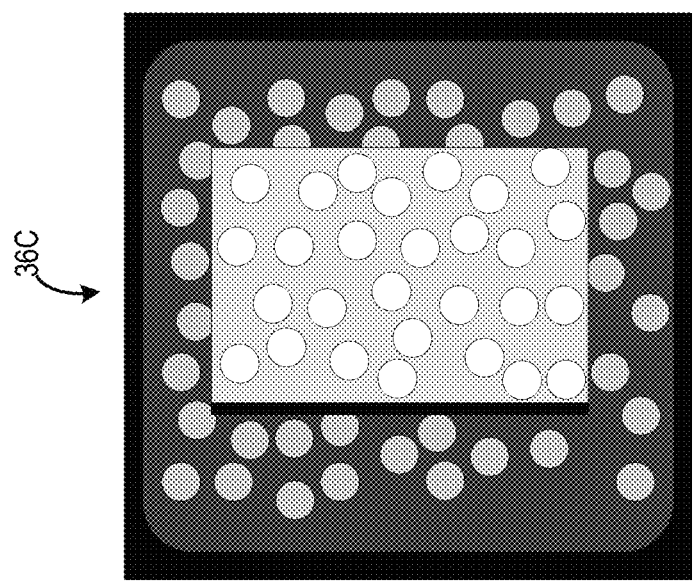
FIG. 4B shows another example image of the example scene illuminated by both a predetermined structured light pattern and a flood fill illumination captured by the depth sensor of the computing device of FIG. 1.
Figure 4A:
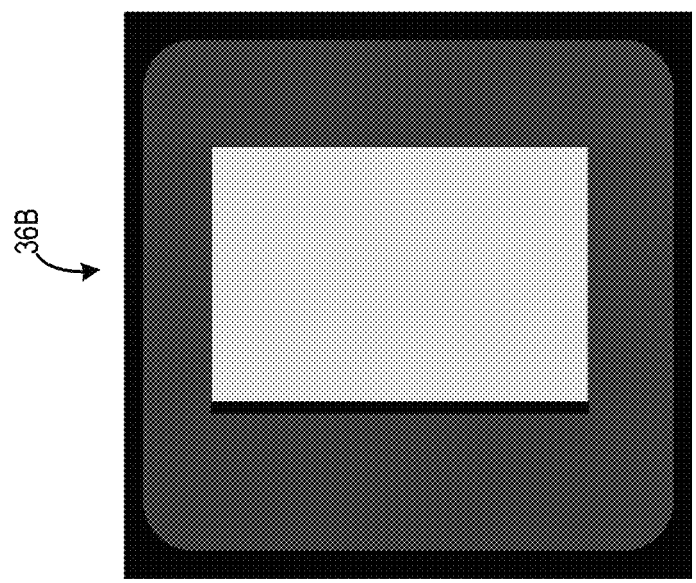
FIG. 4A shows another example image of the example scene illuminated by a flood fill illumination captured by the depth sensor of the computing device of FIG. 1.

As discussed previously, the illuminator 22 is further configured to emit flood fill illumination 28 onto the scene. FIG. 4A illustrates an example image 36B of the same example scene 30 of FIG. 2A illuminated by the flood fill illumination 28. The flood fill illumination 28 projects diffuse illumination of substantially uniform intensity across the area of the scene imaged by the camera 24. However, due to light decay, the intensity of the light imaged by the camera 24 will be different depending upon how close or far away an object in the scene is located from the camera 24. Light intensity of the flood fill illumination 28 reflected off closer objects will be imaged with a higher intensity compared to light intensity of the flood fill illumination 28 reflected off more distant objects in the scene. Thus, as shown in the example image 36B, the object in the scene for the foreground depth 34 is imaged with a higher intensity than the background depth 32. Additionally, as the flood fill illumination 28 projects a uniform illumination, each pixel of the image captured by the camera 24 will receive light data from the flood fill illumination 28. Thus, a large depth disparity between two pixels in the example image 36B indicates the edge of an object in the example scene 30. In this manner, the processor 18 may be configured to detect depth disparities in the image based on light intensity disparities, and detect edges of objects in the scene based on the detected depth disparities. However, while edges in the scene may be detected using the flood fill illumination 28, it will be appreciated that calculating absolute depth values of objects in the scene based on only the flood fill illumination 28 may be difficult or resource intensive.

In one example, the camera 24 is configured to capture a first image of the scene illuminated by the predetermined structured light pattern 26, and a second image of the scene illuminated by the flood fill illumination 28. In this example, the processor 18 may be configured to generate a depth map of the scene by performing stereo matching with the first image and using the second image as a guidance image for accurate edge reconstruction. However, it will be appreciated that due to a time difference between when the first image and the second image are captured, a perspective shift may occur from the user wearing the HMD device 12 moving their head. This perspective shift may reduce the accuracy of the depth map generated for the scene.

Thus, in another example the camera 24 is configured to capture an image of the scene concurrently illuminated by both the predetermined structured light pattern 26 and the flood fill illumination 28. FIG. 4B illustrates an example image 36C of the example scene 30 illuminated by both the predetermined structured light pattern 26 and the flood fill illumination 28. As shown, the flood fill illumination 28 is emitted with a lower intensity than the predetermined structured light pattern 26. In this manner, each pixel in the example image 26C receives at least some illumination. As discussed previously, the flood fill illumination 28 enables the processor 18 to determine depth discontinuities/disparities in the image to detect edges, and the predetermined structured light pattern 26 enables the processor 18 to calculate absolute depth values for each region of interest in the image.

In one example, the predetermined structured light pattern 26 and the flood fill illumination 28 are emitted as infrared light. In this example, the illuminator 22 may be configured to emit infrared light in a predetermined band of infrared light. For example, the illuminator 22 may include diode lasers configured to emit light in the infrared spectrum. In particular the diode lasers may be configured to emit light in a small predetermined band of the infrared light spectrum. Further in this example, the camera 24 may be configured to be sensitive to infrared light in the predetermined band. That is, the camera 24 may be configured to be responsive to infrared light having a wavelength within the predetermined band, and to be less responsive or unresponsive to any light having a wavelength outside the predetermined band. For example, the camera 24 may include a band pass filter configured to filter out light outside of the predetermined band of infrared light. In this manner, the depth sensor 20 may be configured to filter out potential noise from ambient light having wavelengths outside of the predetermined band.

Turning to FIG. 5, the illuminator 22 may include both a structured light illuminator and a flood fill light illuminator. FIG. 5 illustrates a structured light illuminator 38 including a first light emitter 40 and a diffractive optical element 42, the structured light illuminator 38 being configured to emit the predetermined structured light pattern 26. The diffractive optical element 42 is configured to generate constructive and destructive interference using diffractive grating to generate the predetermined structured light pattern from light emitted by the first light emitter 40. In one example, the diffractive optical element 42 receives light from a single mode laser diode having near diffraction limited beam quality, and outputs the predetermined structured light pattern 26. Thus, in this example, the first light emitter 40 may take the form of a single mode diode laser. Typically, these single mode diode lasers may have an output power capability of less than 200 mW. It will be appreciated that while the structured light illuminator 38 may generate other types of structured light patterns than the speckle pattern illustrated in FIG. 5. For example, the diffraction grating of the diffractive optical element 42 may be configured to generate other suitable illumination patterns, including other dot patterns, line based patterns, and other engineered patterns.

FIG. 6 illustrates a flood fill light illuminator 44 including a second light emitter 46 and a diffuser optical element 48, the flood fill light illuminator 44 being configured to emit the flood fill illumination 28. In one example, the diffuser optical element 48 is configured to homogenize and spread incident light using geometric optics, such as, for example, a micro-lens array. In another example, the diffuser optical element 48 may take the form of a uniform flat-top diffractive optical element configured to transform a single or multi-mode input beam into an output beam having a homogenized flat-top intensity. In this manner, the diffuser optical element 48 receives light from the second light emitter 46 taking the form of a high powered multi-mode diode laser, and outputs the flood fill illumination 28 onto the scene in front of the depth sensor 20. In this example, the second light emitter 46 is configured as a high power multi-mode diode laser, and may be configured to have a pulsed peak power greater than 30 W. In another example, the second light emitter 46 may take the form of a light emitting diode having a matched wavelength configured to emit the flood fill illumination 28 onto the scene. It will be appreciated that the example light emitters and optical elements described above are merely exemplary, and that any other suitable configurations may be used to generate the predetermined structured light pattern 26 and flood fill illumination 28.

Figure 7:
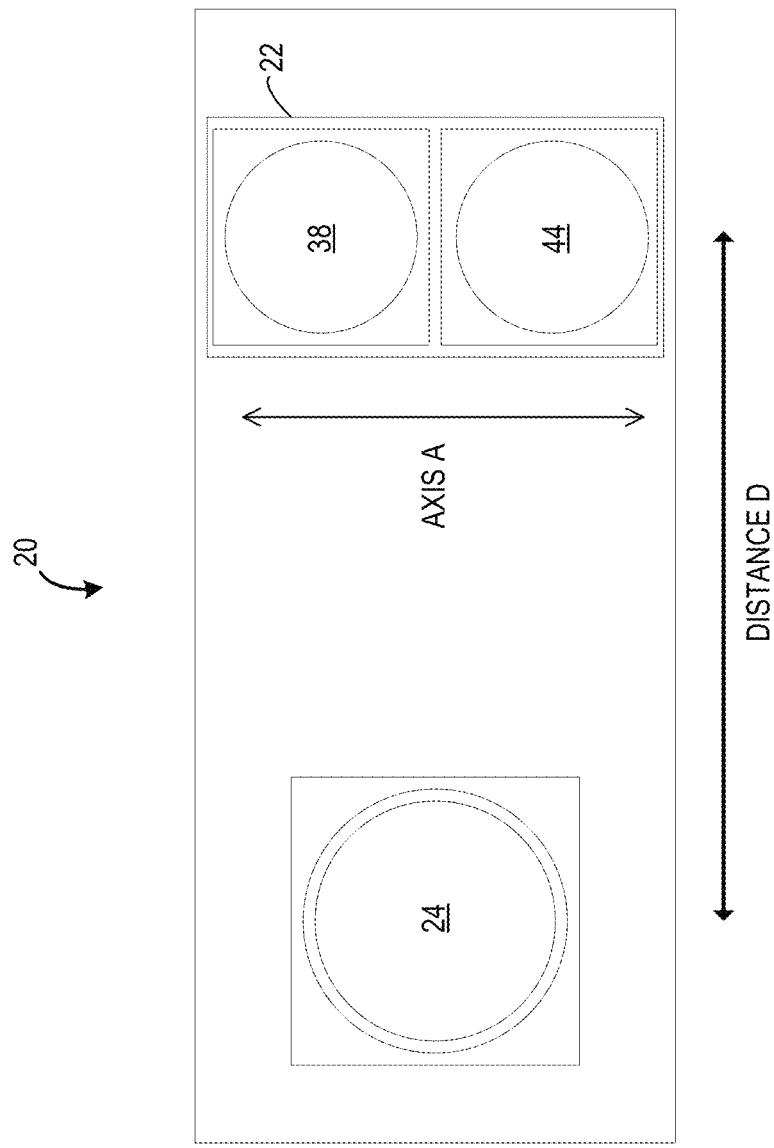
FIG. 7 shows an example depth sensor of the computing device of FIG. 1.

FIG. 7 illustrates an example depth sensor 20 that includes the camera 24 and the illuminator 22 comprising both the structured light illuminator 38 and flood fill light illuminator 44 as described above. As shown, the illuminator 22 is spaced away from the camera 24 by a distance D. The distance D may be set according to the expected scenarios or environments for which the HMD device 12 will be used. A larger distance D will cause a larger binocular disparity between the reference image taken by the camera 24 and the virtual image that a camera at the location of the illuminator 22 would see. Thus, a larger distance D may increase the range of depths that may be detected using stereo techniques described herein. However, a larger distance D also increases the size of the depth sensor 20. Thus, the distance D may be set to achieve a suitable size and performance.

In one example, the structured light illuminator 38 and the flood fill light illuminator 44 are located at co-axial positions on the depth sensor 20 that are substantially equidistant from the camera 24. In the illustrated example, the structured light illuminator 38 and the flood fill light illuminator 44 are co-axial along the axis A, which is perpendicular to an axis of the distance D between the camera 24 and the illuminator 22. By being located at co-axial positions on the depth sensor 20 as illustrated in FIG. 7, the structured light illuminator 38 and the flood fill light illuminator 44 are substantially equidistant from the camera 24. Thus, in this example, the structured light illuminator 38 and the flood fill light illuminator 44 have substantially the same baseline distance D from the camera 24, which may simplify depth calculations performed by the processor 18.

As discussed previously, the illuminator 22 may be configured to emit the predetermined structured light pattern 26 and the flood fill illumination 28 concurrently or separately. In the example depth sensor 20 illustrated in FIG. 7, the structured light illuminator 38 and the flood fill illuminator 44 include separate light emitters, and may be controlled by the processor 18 to achieve a suitable timing, such as concurrently or separately. In one example, the structured light illuminator 38 and the flood fill light illuminator 44 are configured to emit the predetermined structured light pattern 26 and the flood fill illumination 28 at separate points in time, and the camera 24 is configured to capture a first image of the scene illuminated by the predetermined structured light pattern 26 and a second image of the scene illuminated by the flood fill illumination 28. An example first image of the scene is illustrated in FIG. 2B, which, as discussed above, is an example image 36A of the example scene 30 illuminated by only the predetermined structured light pattern 26. An example second image of the scene is illustrated in FIG. 4A, which, as discussed above, is an example image 36B of the example scene 30 illuminated by only the flood fill illumination 28. Based on the first and second images, the processor 18 may be configured to use the depth disparities detected in the second image 26B as edge guidance for the depth map generated using stereo matching algorithms with the first image 36A. Emitting light from the structured light illuminator 38 and the flood light illuminator 44 at separate points in time may potentially reduce overall output power required for illumination and reduce shot noise from the sensor. However, as discussed previously, time elapsed between capture of the first and second images may potentially introduce motion blur between the captured images due to the user of the HMD device 12 moving their head between images.

In another example, the structured light illuminator 38 and the flood fill light illuminator 44 are configured to emit the predetermined structured light pattern 26 and the flood fill illumination 28 concurrently, and the camera 24 is configured to capture an image of the scene concurrently illuminated by both the predetermined structured light pattern 26 and the flood fill illumination 28. An example image of the scene is illustrated in FIG. 4B, which, as discussed above, is an example image 36C of the example scene 30 illuminated by both the predetermined structured light pattern 26 and the flood fill illumination 28. Similarly, the processor 18 may be configured to use depth disparities detected based on the imaged flood fill illumination 28 as edge guidance for the depth map generated using stereo matching algorithms with the imaged predetermined structured light pattern 26. By capturing a single image of the scene concurrently illuminated with both the predetermined structured light pattern 26 and the flood fill illumination 28, potential motion blur may be minimized. However, concurrently emitting both the predetermined structured light pattern 26 and the flood fill illumination 28 may potentially increase the overall output power required for the depth sensor 20.

Figure 8:
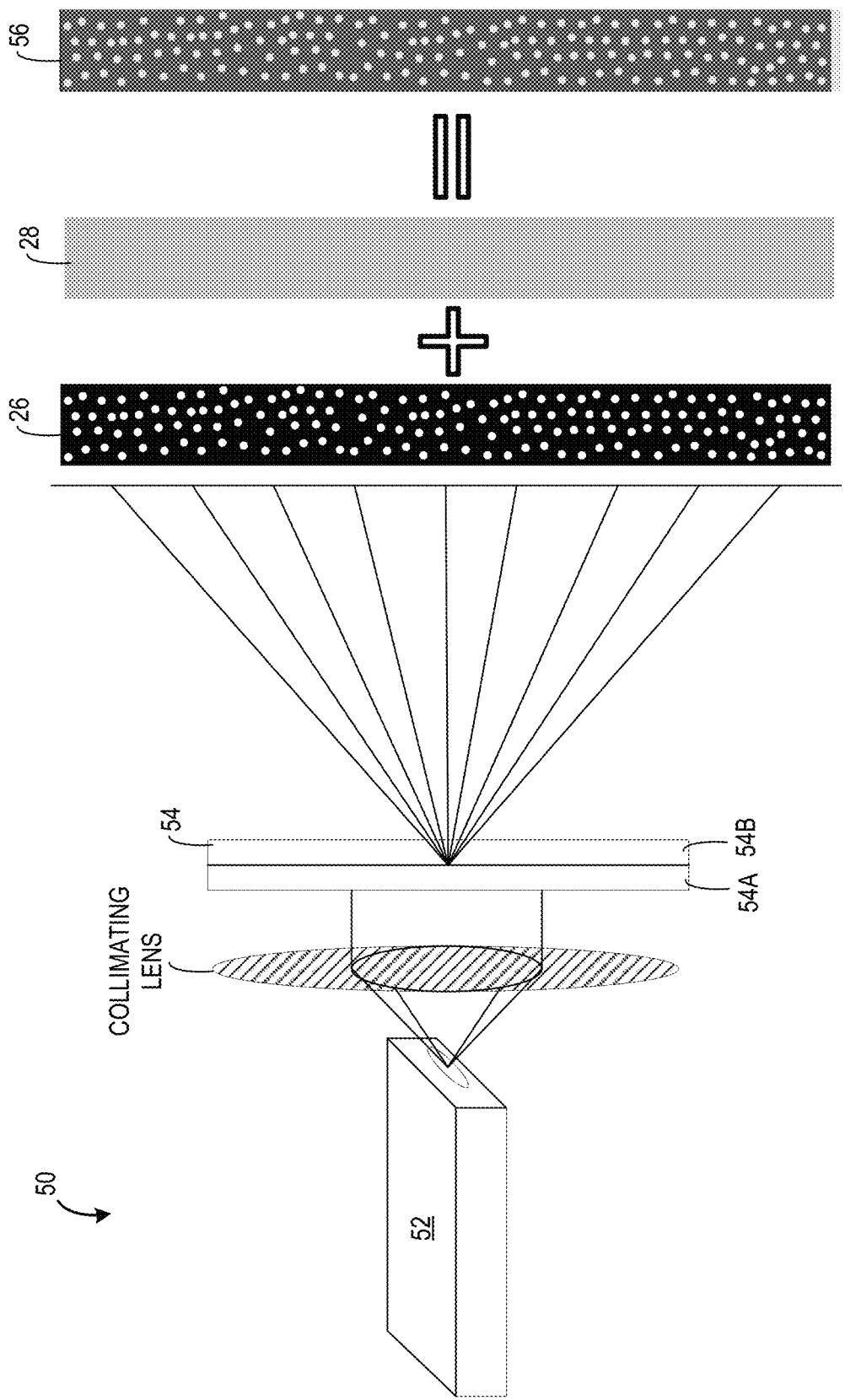
FIG. 8 shows an example hybrid light illuminator of the depth sensor of the computing device of FIG. 1.

FIG. 8 illustrates a hybrid light illuminator 50 including a light emitter 52 and a hybrid diffractive optical element 54, the hybrid light illuminator 50 being configured to emit both the predetermined structured light pattern 26 and the flood fill illumination 28. As shown, the emitted light 56 from the hybrid light illuminator 50 is the superposition of the predetermined structured light pattern 26 and the flood fill illumination 28. In one example, the hybrid diffractive optical element 54 includes a first diffractive portion 54A configured for the predetermined structured light pattern 26 and a second diffractive portion 54B configured for the flood fill illumination 28. That is, the first diffractive portion 54A includes a diffraction pattern for the predetermined structured light pattern 26 and the second diffractive portion 54B includes a tophat diffraction pattern for the flood light illumination 28. Light emitted from the light emitter 52 samples both the first diffractive portion 54A and the second diffractive portion 54B while passing through the hybrid diffractive optical element 54, producing a light pattern that is the superposition of the predetermined structured light pattern 26 and the flood fill illumination 28.

In one example, a ratio between the first diffractive portion 54A and the second diffractive portion 54B may be set to achieve a suitable ratio between the intensity of the emitted predetermined structured light pattern 26 and the flood fill illumination 28. For example, the hybrid diffractive optical element 54 may include a larger portion of the first diffractive portion 54A compared to the second diffractive portion 54B, such that the hybrid light illuminator 50 emits the flood fill illumination 28 with a lower light intensity than the predetermined structured light pattern 26. In one specific example, the hybrid light illuminator 50 may be configured to emit the flood fill illumination 28 with a tenth, an eighth, a quarter, or half the light intensity of the predetermined structured light pattern. However, it will be appreciated that the hybrid light illuminator 50 may be configured to emit other suitable ratios of light intensity between the flood fill illumination 28 and the predetermined structured light pattern 26, such as, for example, a 1 to 6 ratio, a 1 to 5 ratio, etc.

Figure 9:
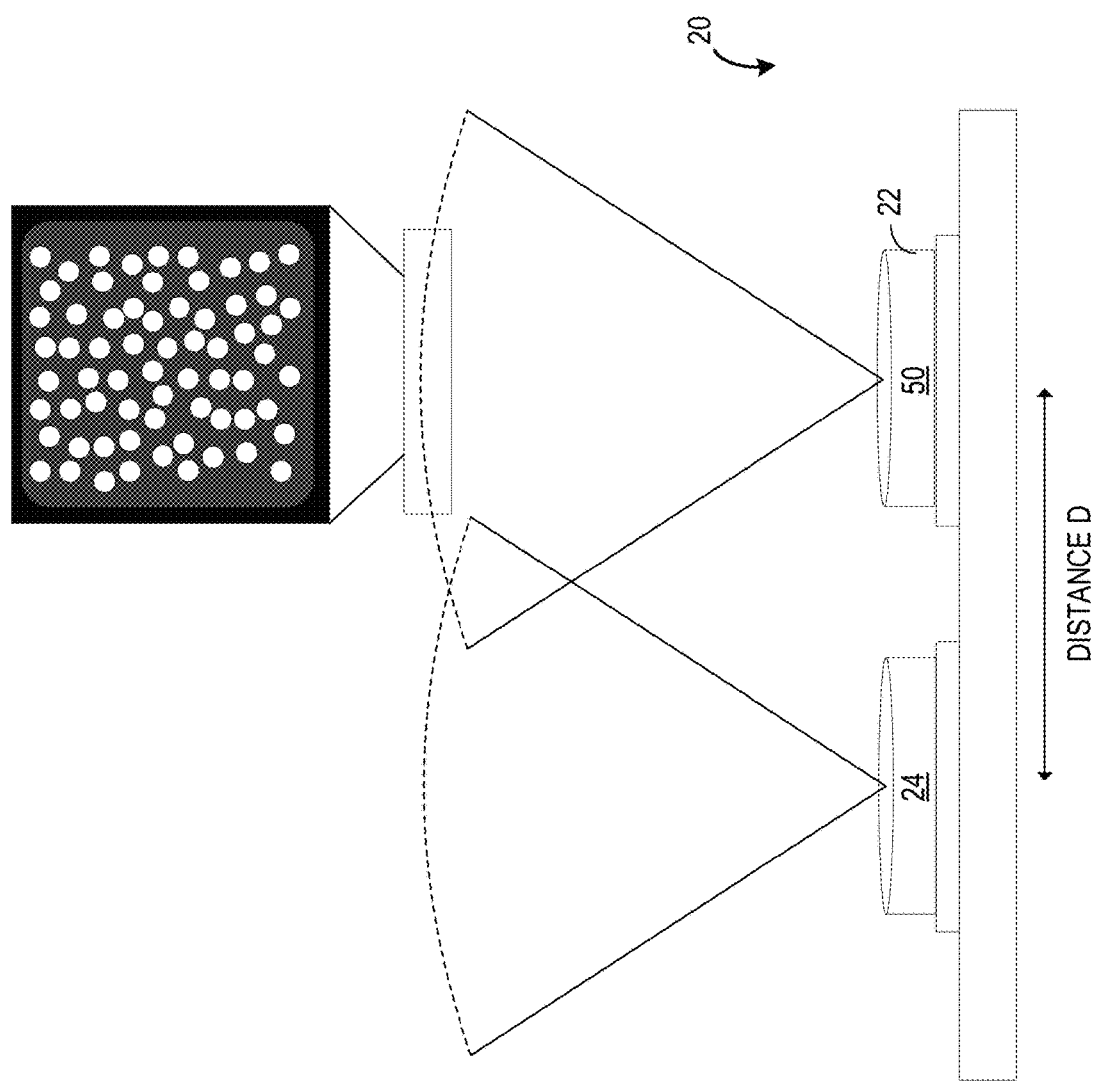
FIG. 9 shows another example depth sensor of the computing device of FIG. 1.

FIG. 9 illustrates an example depth sensor 20 that includes a camera 24 and an illuminator 22 comprising the hybrid light illuminator 50. In one example, the predetermined structured light pattern 26 and the flood fill illumination 28 are emitted from the hybrid light illuminator 50 co-aligned. That is, both the predetermined structured light pattern 26 and the flood fill illumination 28 are emitted from the same light source, the hybrid light illuminator 50. As illustrated, the hybrid light illuminator 50 is spaced away from the camera 24 by a baseline distance D. As discussed previously, the baseline distance D may be set to achieve a suitable size and performance of the depth sensor 20.

Figure 10:
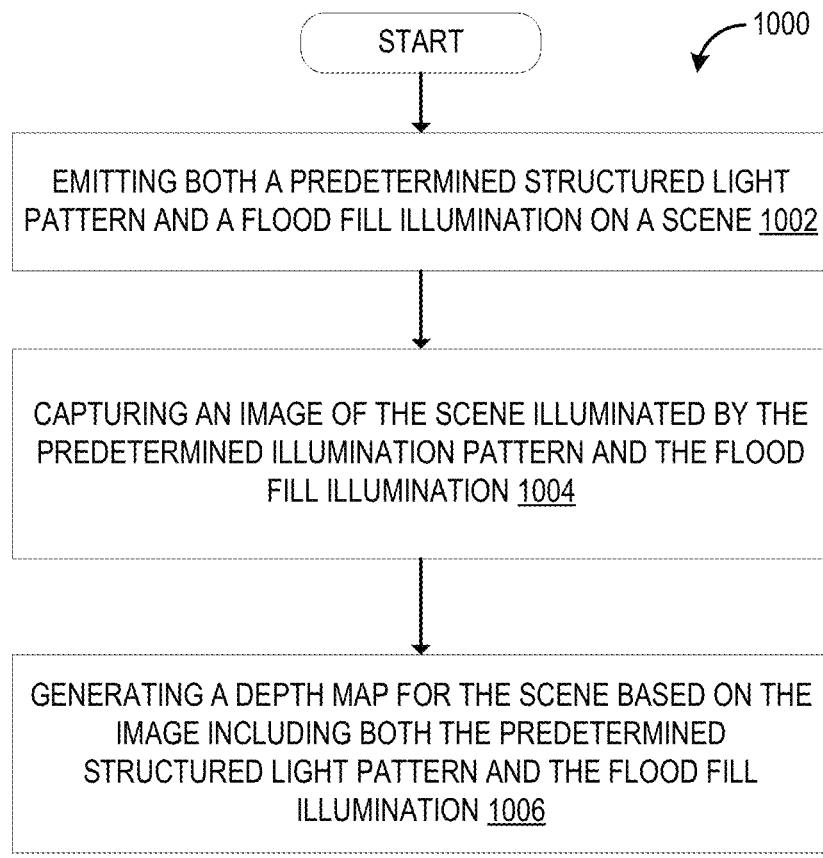
FIG. 10 shows an example method for generating a depth map using the depth sensor of the computing device of FIG. 1.

FIG. 10 shows an example method 1000 for generating depth maps using the depth sensor 20 described herein. At step 1002, the method 1000 may include emitting both a predetermined structured light pattern 26 and a flood fill illumination 28 on a scene. As discussed above, the depth sensor 20 includes an illuminator 22 configured to emit both the predetermined structured light pattern 26 and the flood fill illumination 28. In one example, the illuminator 22 may include a structured light illuminator 38 and a flood fill light illuminator 44, which may be configured to emit the predetermined structured light pattern 26 and the flood fill illumination 28 concurrently or at separate points in time. In another example, the illuminator 22 may include a hybrid light illuminator 50 configured to coaxially emit both the predetermined structured light pattern 26 and the flood fill illumination 28 onto the scene.

At step 1004, the method 1000 may include capturing an image of the scene illuminated by the predetermined structured light pattern 26 and the flood fill illumination 28. The image of the scene is captured by the camera 24 of the sensor device 20. In one example where the illuminator 22 is configured to emit the predetermined structured light pattern 26 and the flood fill illumination 28 at separate points in time, step 1004 may include capturing a first image of the scene illuminated by the predetermined structured light pattern 26, and a second image of the scene illuminated by the flood fill illumination 28.

At step 1006, the method 1000 may include generating a depth map for the scene based on the image including both the predetermined structured light pattern 26 and the flood fill illumination 28. Several methods for generating depths maps with accurate depth boundary reconstruction based on the image of the scene including both the predetermined structured light pattern 26 and the flood fill illumination 28 are discussed below.

Figure 11:
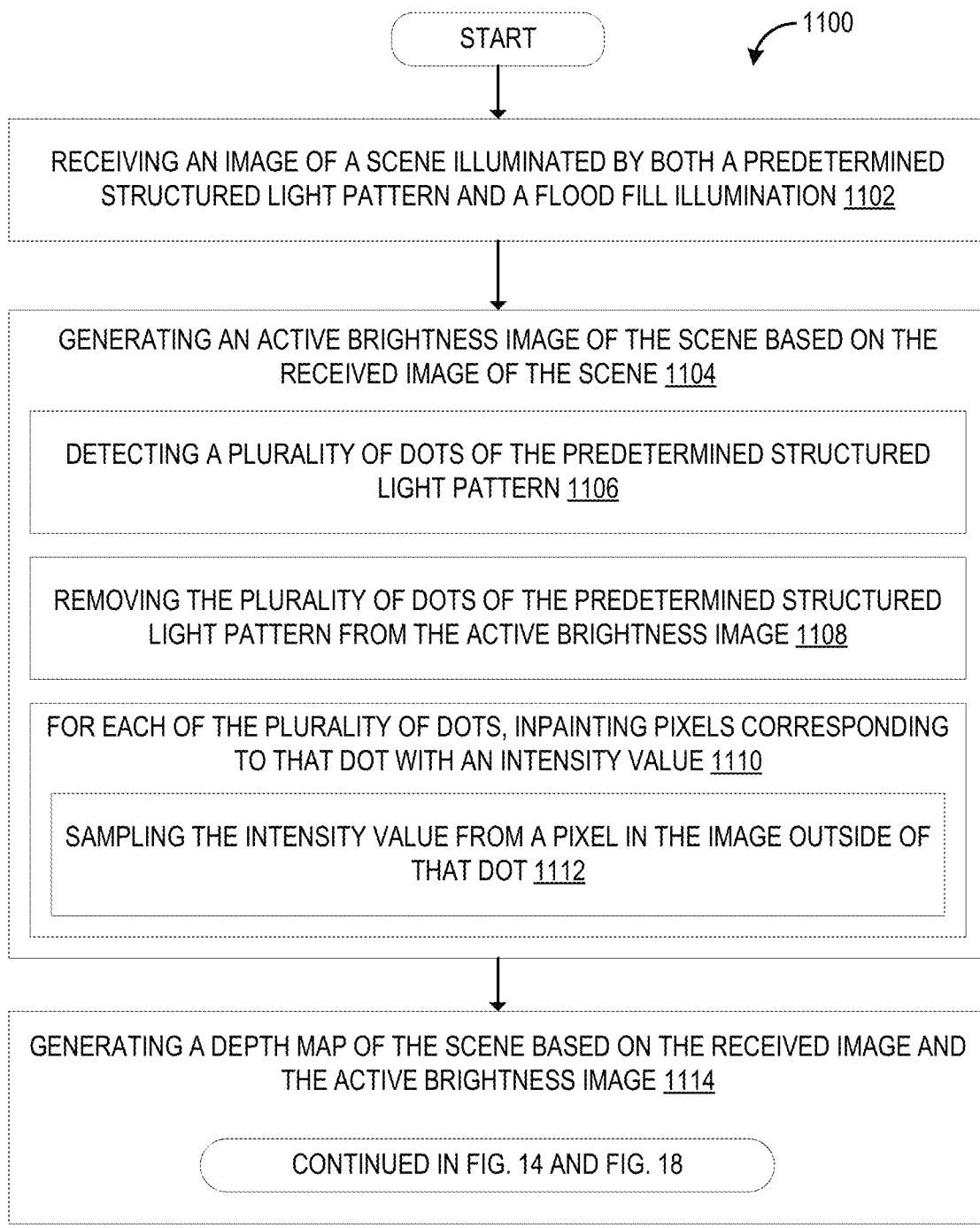
FIG. 11 shows another example method for generating a depth map using the depth sensor of the computing device of FIG. 1.
Figure 12B:
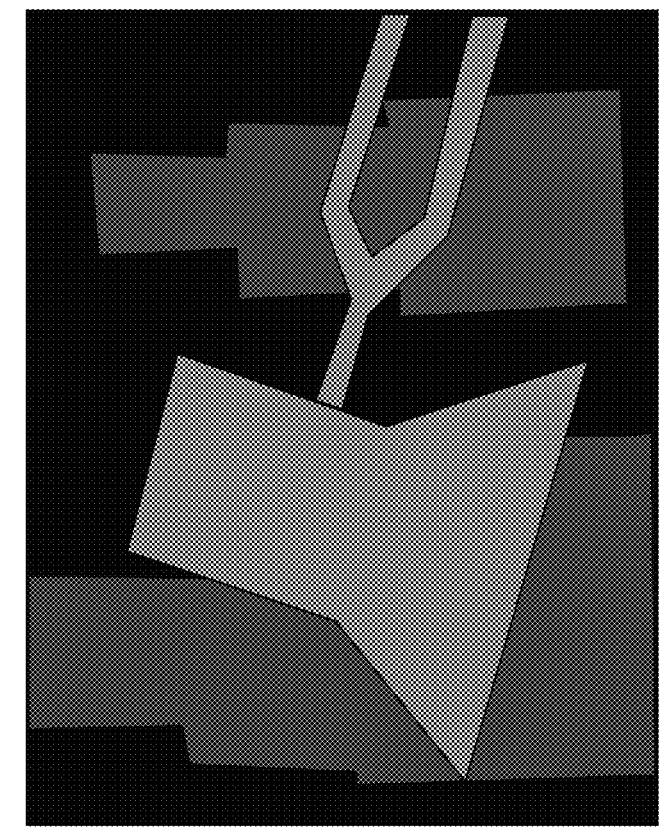
FIG. 12B shows an example active brightness image generated based on the image captured by the camera 24 of the depth sensor of the computing device of FIG. 1.
Figure 12A:
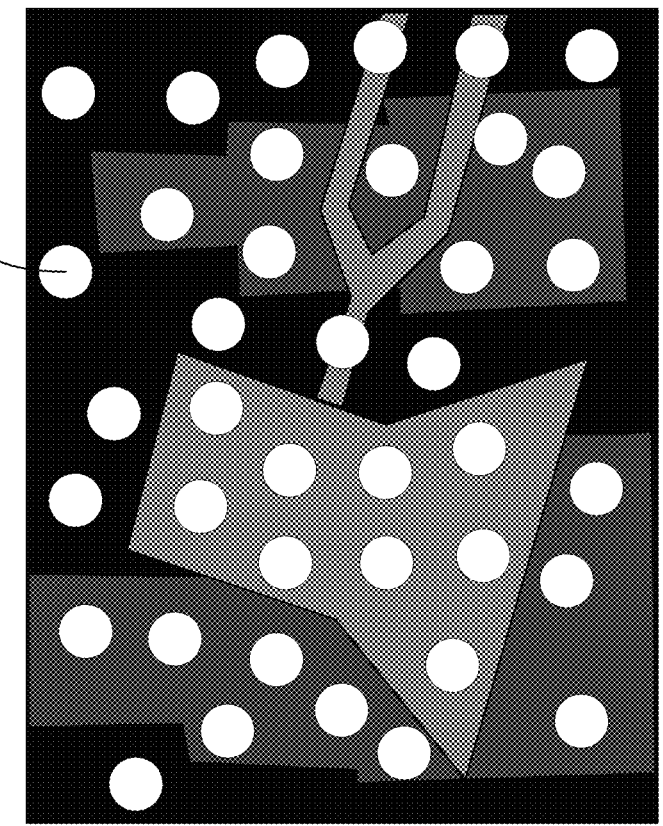
FIG. 12A shows an example image captured by the camera 24 of the depth sensor of the computing device of FIG. 1.

FIG. 11 shows an example method 1100 for generating depth maps using captured images of a scene illuminated by both the predetermined structured light pattern 26 and the flood light illumination 28 described above. In one example, the example method 1100 may be implemented by the processor 18 of the computing device 10, which, may for example, take the form of the HMD device 12. At step 1102, the example method 1100 may include receiving an image of a scene illuminated by both a predetermined structured light pattern 26 and a flood fill illumination 28. The image of the scene may be captured by the camera 24 of the depth sensor 20 described above with reference to the example method 1000. FIG. 12A illustrates an example image 36D of an example scene. In this example, the illuminator 22 is configured to emit the predetermined structured light pattern 26 and the flood fill illumination 28 in the infrared light range, and the camera 24 is configured to be sensitive to light in the infrared light range. Thus, each pixel of the example image 36D has an intensity value proportional to the intensity of the infrared light captured by the camera 24 at that pixel. As illustrated in FIG. 12A, the reflection of the predetermined structured light pattern 26 is captured by the camera 24 as a plurality of dots 58. Pixels of the example image 36D within the plurality of dots 58 have a higher intensity value compared to pixels of the example image 36D outside of the plurality of dots 58 which may only have been illuminated by the flood fill illumination 28.

At step 1104, the example method 1100 may include generating an active brightness image of the scene based on the received image of the scene. FIG. 12B illustrates an example active brightness image 60 generated based on the example image 36D of the example scene. In one example, the processor 18 is configured to initialize the example active brightness image 60 by copying the intensity values of the example received image 36D pixel by pixel. However, the example received image 36D includes the plurality of dots 58 from the reflection of the predetermined structured light pattern 26, which have a higher intensity than the surrounding flood fill illumination 28. Consequently, a naive edge guidance algorithm that uses the received image 36D itself as a guidance image to filter a depth map generated using the predetermined structured light pattern 26 would potentially interpret the intensity gradients at the edges of each of the plurality of dots 58 as being depth boundaries in the scene, thus introducing depth artifacts in the filtered depth maps. Thus, in one example, the example method 1100 may be configured to remove the plurality of dots 58 from the example active brightness image 60 copy of the received image 36D, as described in the below steps.

At step 1106, the example method 1100 may include detecting a plurality of dots of the predetermined structured light pattern. In the example illustrated in FIG. 12A, the processor 18 implementing example method 1100 may be configured to detect the plurality of dots 58 in the received image 36D that are the result of the emitted predetermined structured light pattern 26 reflecting off objects in the scene and impinging upon a light sensor of the camera 24 of the depth sensor 20. In one example, the processor 18 may be configured to detect the plurality of dots 58 based on a characteristic shape and size of the individual shapes of the predetermined structured light pattern 26. For example, the predetermined structured light pattern 26 may include circular shaped dots having a diameter of one or two pixels, and the processor 18 may be configured to detect groupings of intensity values in the active brightness image that are circularly shaped and have a diameter of one or two pixels. It will be appreciated that the dot based pattern example described herein is exemplary, and that the processor 18 may be configured to recognize any suitable type of predetermined structured light pattern 26 that the illuminator 22 of the depth sensor 20 may be configured to emit. In another example, the processor 18 may be configured to detect a particular range of intensity values. As described previously, the predetermined structured light pattern 26 is emitted with a higher light intensity than the flood fill illumination 28. In this example, the processor 18 may be configured to determine that pixels in the active brightness image that have a higher intensity value than the expected intensity of the flood fill illumination 28 correspond to reflected light from the predetermined structured light pattern 26. It will be appreciated that the methods of detecting the plurality of dots of the predetermined structured light pattern 26 described above are merely exemplary, and that other suitable detection methods may be implemented by the processor 18.

At step 1108, the example method 1100 may include removing the plurality of dots 58 of the predetermined structured light pattern 26 from the active brightness image that includes pixel by pixel copied intensity values from the received image 36D. Merely removing the plurality of dots 58 by deleting the corresponding intensity values or setting the corresponding intensity values to a default value for the pixels covered by the plurality of dots 58 may introduce holes in the active brightness image and potentially cause depth artifacts in the depth map that is filtered using such an active brightness image. Accordingly, the example method 1100 may further include inpainting the pixels covered by the detected plurality of dots 58 with suitable intensity values.

Figure 13:
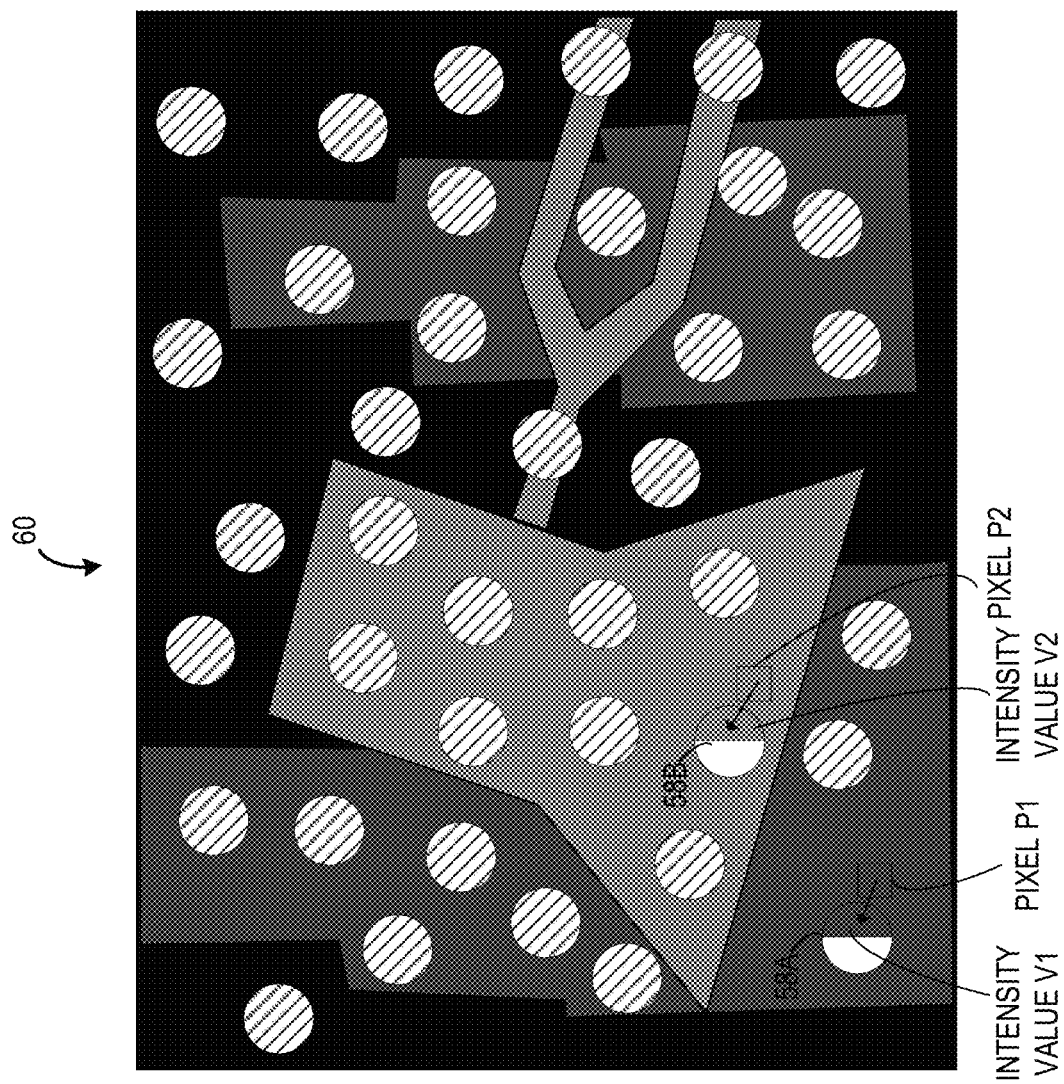
FIG. 13 shows an example active brightness image generated based on the image captured by the camera 24 of the depth sensor of the computing device of FIG. 1.

At step 1110, the example method 1100 may include, for each of the plurality of dots 58 of the predetermined structured light pattern 26, inpainting pixels corresponding to that dot with an intensity value. FIG. 13 shows an example of inpainting intensity values for the example active brightness image 60. To reduce or minimize potential depth artifacts, the processor 18 may be configured to inpaint the pixels corresponding to a dot of the plurality of dots 58 with an intensity value from another pixel that lies on the same or substantially similar depth plane as that dot. In one example, step 1110 may include substep 1112 of the example method 1100, and may include sampling the intensity value from a pixel in the image outside of that dot. The intensity value may be sampled from another pixel that is within a threshold pixel distance of the outside edge of the dot, such as, within two pixels, three pixels, or another suitable threshold pixel distance. In one example, the sampled intensity value may be an average or median of each other pixel within the threshold pixel distance. In another example, the intensity value is sampled from a next closest pixel outside of that dot. That is, the processor 18 may be configured to select a pixel that borders the pixels corresponding to the dot, copy the intensity value from the selected pixels, and inpaint all of the pixels in the active brightness image that correspond to that particular dot of the plurality of dots 58.

In the example illustrated in FIG. 13, the processor 18 detects the first dot 58A and its corresponding set of pixels in the active brightness image covered by that dot, and selects a next closest pixel outside of that set of pixels. In the illustrated example, the processor 18 selects pixel P1, which borders the set of pixels corresponding to the first dot 58A. Next, the processor 18 is configured to copy the intensity value V1 of the pixel P1 in the active brightness image, and inpaints each pixel of the set of pixels corresponding to the first dot 58A with the intensity value V1. The processor 18 continues this inpainting process for each dot in the plurality of dots 58. For example, a second dot 58B, which lies on a different depth plane than the first dot 58, is inpainted with a different intensity value V2 from a different pixel P2, which borders a set of pixels corresponding to the second dot 58B. In this manner, the processor 18 inpaints each dot of the plurality of dots 58 with suitable intensity values from other pixels that lie on the same depth plane as the pixels covered by each of those dots. FIG. 12B illustrates an example active brightness image 60 after each of the plurality of dots 58 were inpainted with suitable intensity values according to the method discussed above.

At step 1114, the example method 1100 may include generating a depth map of the scene based on the received image and the active brightness image. In the example illustrated in FIG. 12A and FIG. 12B, the processor 18 may be configured to generate a depth map for the example scene using the example received image 36D and the example active brightness image 60 as input. In one example, the processor 18 may be configured to calculate depth values for each pixel in the received image 36D based on the imaged predetermined structured light pattern, which are the plurality of dots 58 in the illustrated example. Additionally, the processor 18 may be configured to filter or guide the calculated depth values for each pixel based on the example active brightness image 60 to accurately reconstruct depth boundaries in the example scene.

Figure 14:
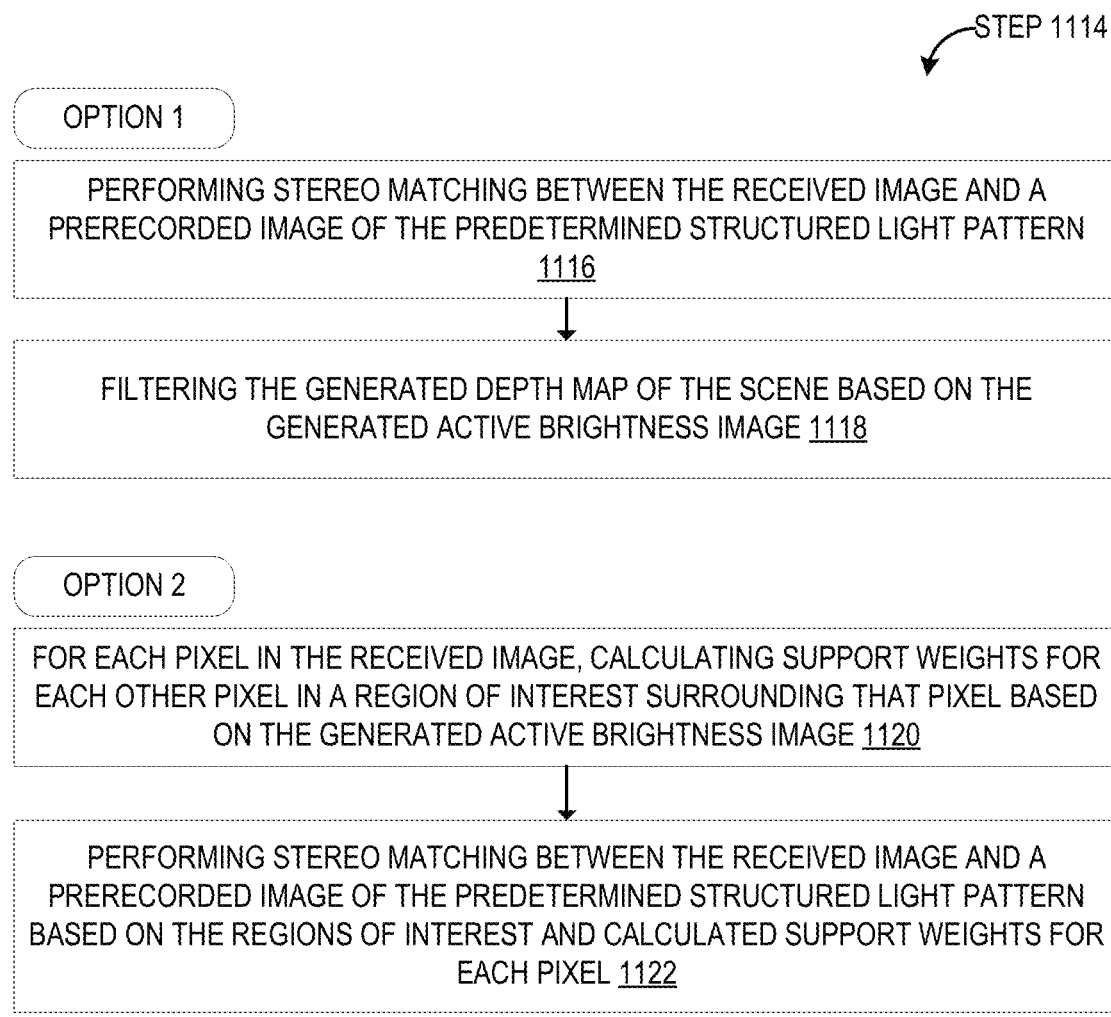
FIG. 14 continues the example method of FIG. 11.

Step 1114 may include three different sets of substeps for generating the depth map of the scene based on the received image and the active brightness image. These sets of substeps are continued in FIG. 14 and FIG. 18. As shown in FIG. 14, a first set of substeps includes substeps 1116 and 1118. At substep 1116, the example method 1100 may include performing stereo matching between the received image and a prerecorded image of the predetermined structured light pattern. In one example, the prerecorded image of the predetermined structured light pattern 26 is a virtual image of what a virtual camera at the location of the illuminator 22 would see. As discussed previously, as the perspective for the prerecorded image is along the same axis that the predetermined structured light pattern 26 is emitted from the illuminator 22, the prerecorded image remains constant regardless of the content of the scene being mapped by the depth sensor 20. Thus, the received image captured by the camera 24 and the prerecorded image representing a virtual camera at the location of the illuminator 22 form a stereo pair.

Figure 15B:
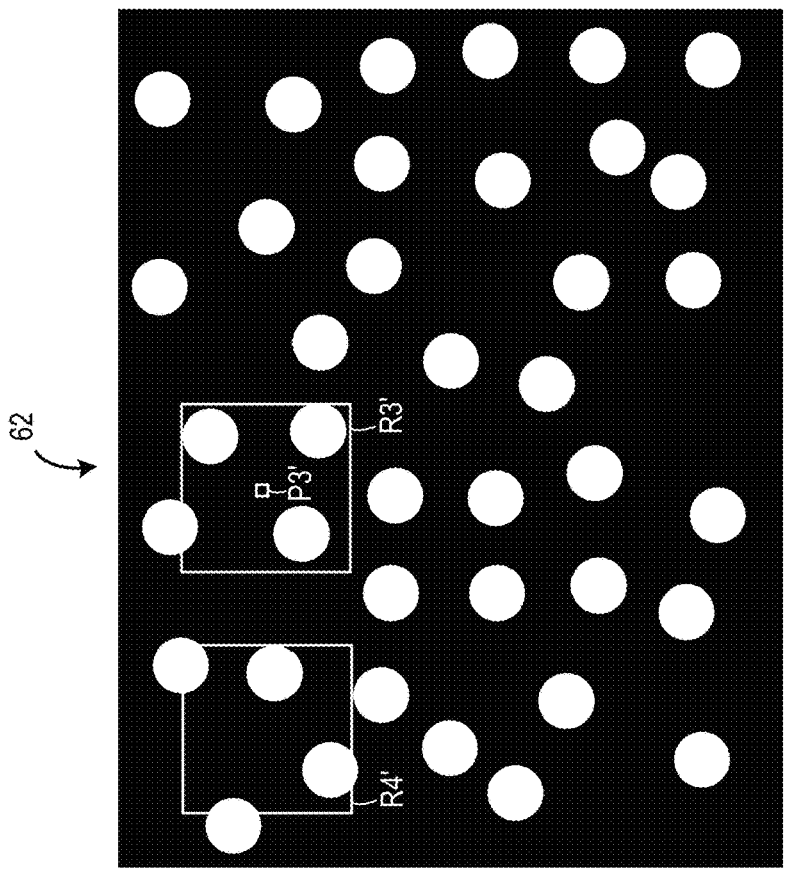
FIG. 15B shows an example prerecorded image for the predetermined structured light pattern for the depth sensor of the computing device of FIG. 1.
Figure 15A:
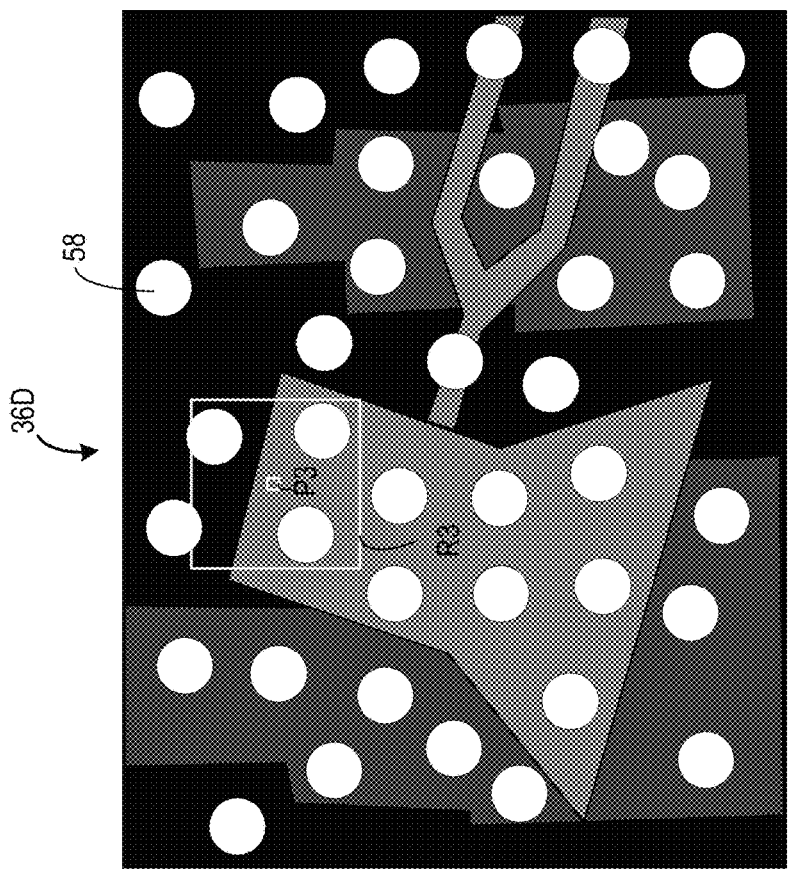
FIG. 15A shows an example image captured by the camera 24 of the depth sensor of the computing device of FIG. 1.

In one example, the processor 18 implements a stereo matching process to match each pixel of the received image with a corresponding pixel of the prerecorded image, such that the matched pixels view the same location in the scene. To perform stereo matching, the processor 18 may be configured to center a match window or region of interest around each pixel of the received image, and select corresponding match windows or regions of interest from the prerecorded image based on a similarity between intensity values of each pixel in the potential pairs of match windows or regions of interest. FIG. 15A illustrates an example candidate region of interest R3 centered around a candidate pixel P3 from the received image 36D of the example scene. In the illustrated example, the size of the dots, the size of the pixels, and the region of interest, are exaggerated for ease of illustration. Typically, each dot of the predetermined structured light pattern 26 may be one to two pixels in diameter, and the dimensions of the regions of interest may be five pixels by five pixels. However, it will be appreciated that the dimensions of the dots of the predetermined structured light pattern and the regions of interest may be selected to achieve a suitable efficiency and accuracy of the stereo matching algorithm. Additionally, while the region of interest illustrated in FIG. 15A is depicted as a square, it will be appreciated that the region of interest may take the form of any suitable shape, such as a circle, a triangle, a rectangle, etc.

In the example illustrated in FIG. 15A, the candidate region of interest R3 centered around the candidate pixel P3 contains three dots of the plurality of dots 58 at particular locations within the candidate region of interest R3. In this example, the processor 18 may be configured to iterate through regions of interest of the example prerecorded image 62 illustrated in FIG. 15B to find a matching region of interest that has a highest matching correspondence to the candidate region of interest R3. For example, region of interest R4' from the prerecorded image 62 only includes two dots of the predetermined structured light pattern 26 that are at different relative locations within the region of interest R4' compared to the particular relative locations of the three dots within the candidate region of interest R3. By performing a pixel by pixel intensity value comparison between the candidate region of interest R3 and the region of interest R4' from the prerecorded image 62, the processor 18 may determine that the two illustrated regions of interest have a low matching correspondence. On the other hand, be performing the same process with the region of interest R3' from the prerecorded image 62, the processor 18 may determine that the candidate region of interest R3 and the region of interest R3' from the prerecorded image 62 have a higher matching correspondence of pixel intensity values within the two regions of interest. After determining that the two regions of interest R3 and R3' match, the processor 18 may be configured to determine that the candidate pixel P3 at the center of the candidate region of interest R3 and the matching pixel P3' at the center of the matching region of interest R3' form a stereo pair, and may calculate a depth value for the candidate pixel P3 of the example received image 36D using the method described with reference to FIG. 2C.

Figure 16B:
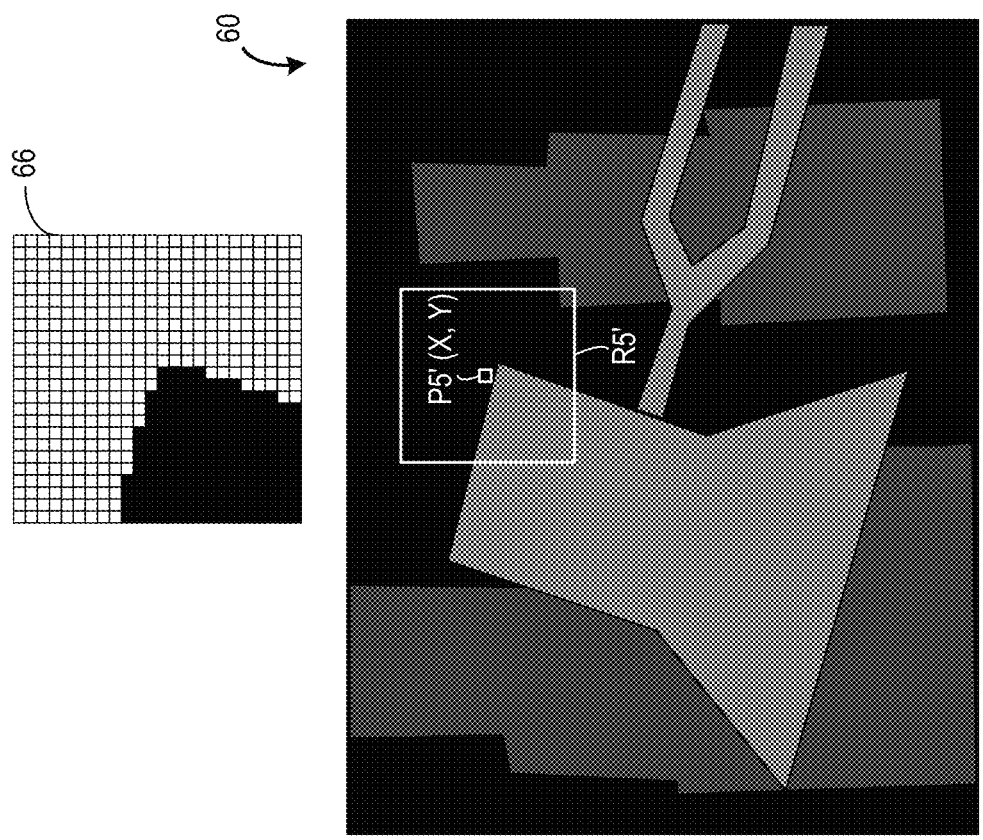
FIG. 16B shows an example support weighting for the example image captured by the depth sensor of the computing device of FIG. 1.
Figure 16A:
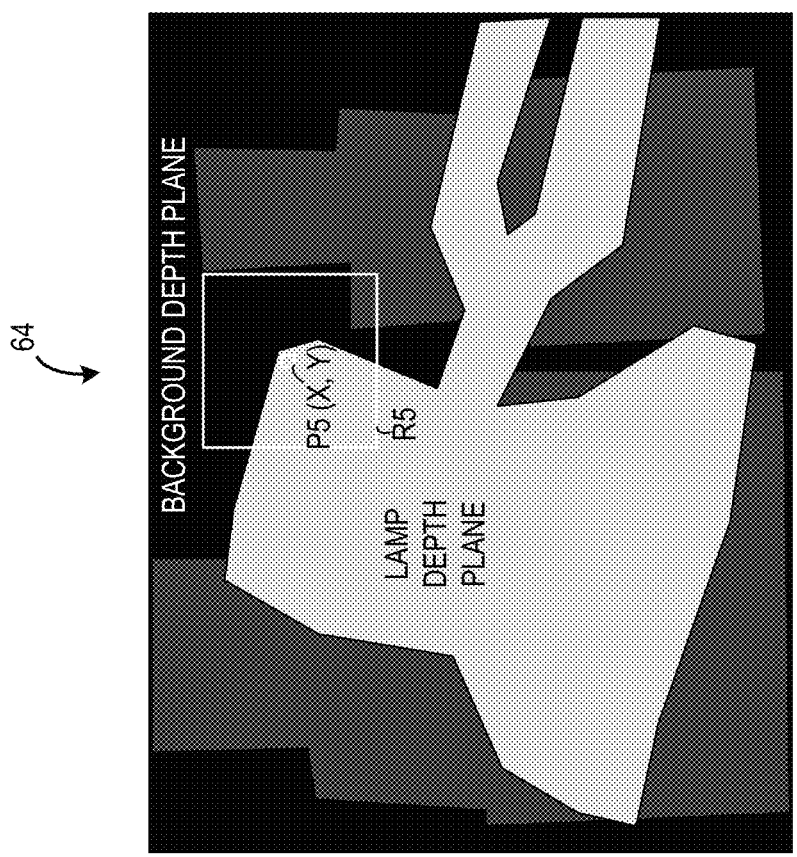
FIG. 16A shows an example depth map for the example image captured by the depth sensor of the computing device of FIG. 1.

FIG. 16A illustrates an example depth map 64 generated for the example received image 36D using the stereo matching process described above with reference to FIG. 15A and FIG. 15B. As shown, edges in the example depth map 64 may be blown out and inaccurate at depth boundaries in the scene. Inaccurate edges typically occur with block/patch matching algorithms that only use structured light as input, as typical structured light depth sensors do not provide light data for pixels in the spaces between the structured light, which makes detecting edges/depth boundaries that lie in those spaces between the structured light difficult to accurately reconstruct when generating the depth map. However, the example active brightness image 60 includes light intensity data for all pixels in the image of the scene, and may be used by the processor 18 to accurately reconstruct depth boundaries in the scene.

Turning back to FIG. 14, at substep 1118, the method 1110 may include filtering the generated depth map of the scene based on the generated active brightness image. As discussed above with reference to FIG. 16A, the example generated depth map 64 for the example received image 36D has inaccurate depth boundaries. To reconstruct the depth boundaries of the example scene, the processor 18 implementing the method 1110 may be configured to filter the example generated depth map 64 using the example active brightness image 60. That is, the processor 18 may be configured to perform postprocessing on the example generate depth map 64 to improve the edges in the depth map to more accurately represent the actual depth boundaries in the scene.

In one example, to filter the generated depth of the scene, the processor 18 may be configured to, for each pixel in the generated depth map, determine a region of interest centered at that pixel, and determine a corresponding active brightness pixel and active brightness region of interest centered at that active brightness pixel in the generated active brightness image. In this example, the active brightness image was generated based on the received image, and has the same perspective as the received image. Thus, each pixel in the depth map generated from the received image has a corresponding pixel in the active brightness image at the same pixel location. In the example illustrated in FIG. 16A, the depth map pixel P5 has a pixel location (X, Y), which has a corresponding active brightness pixel P5' at the same pixel location (X, Y) in the example active brightness image 60 illustrated in FIG. 16B. Similarly, the depth map region of interest R5 centered at the depth map pixel P5 also has a corresponding active brightness region of interest R5'. It will be appreciated that both the depth map pixel P5 and the corresponding active brightness pixel P5' are viewing the same location in the scene. However, due to the edge reconstruction inaccuracy of the block matching stereo algorithm, the depth map pixel P5 was assigned a depth value that lies on the same depth plane as the lamp object in the example scene. Whereas the corresponding active brightness pixel P5' in the example active brightness image 60, which is viewing the same location in scene as the depth map pixel P5, has an intensity value that indicates that the active brightness pixel P5' lies on a background depth plane that is farther away from the depth sensor 20 than the lamp object. However, as the active brightness image provides intensity data for every pixel in the image, the active brightness image includes accurate depth disparity/depth boundary data.

To filter the example depth map 64 based on the example active brightness image 60 to improve the depth boundaries, the processor 18 may be configured to calculate support weights for each pixel in the active brightness region of interest other than the center pixel. In the example illustrated in FIG. 16B, the value of the support weight for a particular pixel in the example active brightness region of interest R5' indicates how similar the intensity value for that pixel is compared to the intensity value of the active brightness pixel P5' at the center of the active brightness region of interest R5'. That is, pixels in the active brightness region of interest R5' with a dissimilar intensity value compared to the center active brightness pixel P5' are assigned a low weighting, and pixels in the active brightness region of interest R5' with a similar intensity value compared to the center active brightness pixel P5 are assigned a higher weighting.

Figure 17:
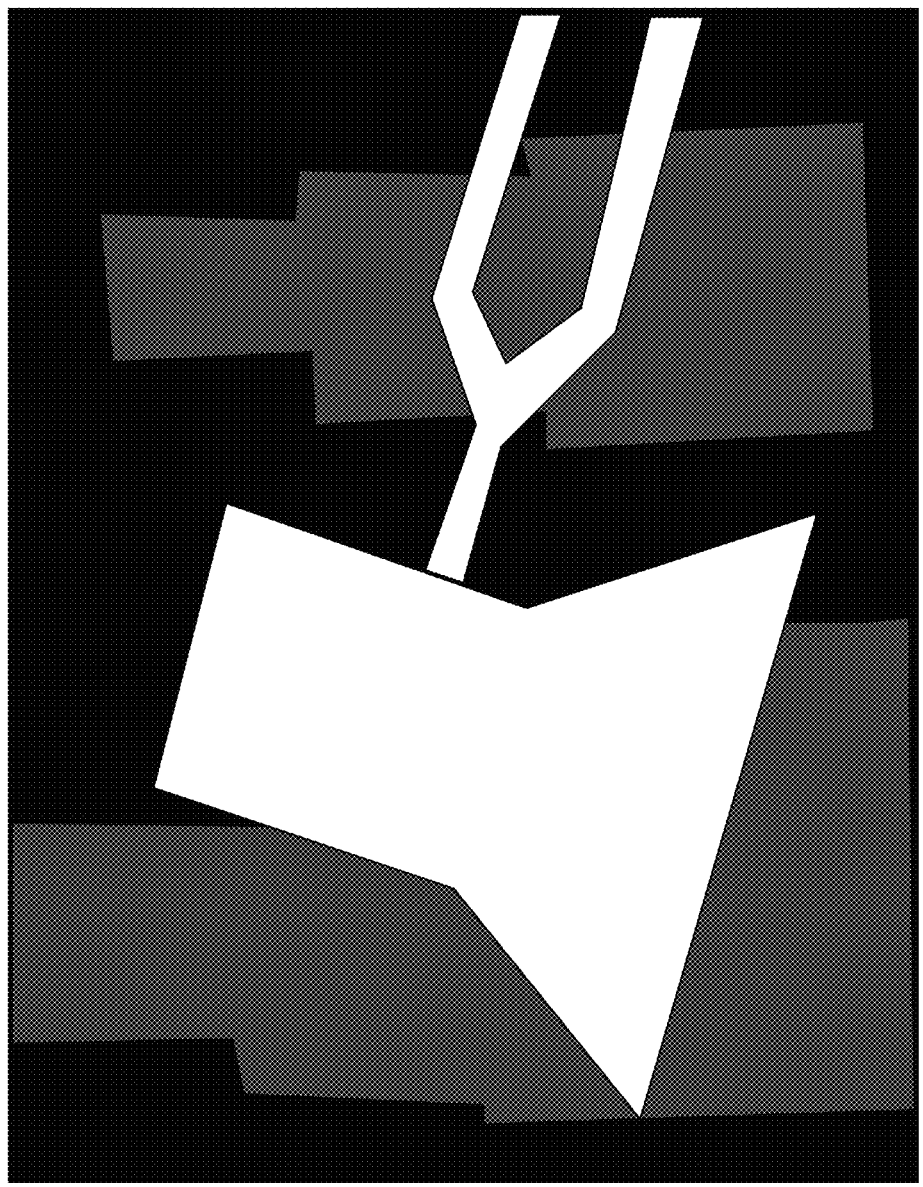
FIG. 17 shows an example depth map with accurate depth boundaries for the example image captured by the depth sensor of the computing device of FIG. 1.

FIG. 16B illustrates an example of calculated support weights 66 for the example active brightness region of interest R5'. As shown, the pixels that lie on the same background depth plane as the center active brightness pixel P5' are assigned a higher weighting, which is illustrated as a white color in FIG. 16B. On the other hand, the pixel that lie on the lamp depth plane that is closer to the depth sensor 20 than the center active brightness pixel P5' are assigned a lower weighting, which is illustrated as a black color in FIG. 16B. Next, the processor 18 may be configured to apply the calculated support weights 66 to the depth map pixel P5 to recalculate the depth value for that pixel. For example, the depth value for the depth map pixel P5 may be recalculated as a weighted median depth value of all pixels within the depth map region of interest R5 by applying the calculated support weights 66 to the depth values of each pixel in the depth map region of interest R5. In the example illustrated in FIG. 16A, the calculated support weights 66 will reduce the weight of the pixels in the lower left quadrant of the depth map region of interest R5, and increase the weight of the pixels in the other quadrants of the depth map region of interest R5, which will result in the center depth map pixel of interest P5 having a weighted median depth value that is similar to the other pixels that lie on the background depth plane. In this example, after filtering each pixel of the example depth map 64 using the support weight method described above, the processor 18 may generate an example filtered depth map 68 illustrated in FIG. 17. The example filtered depth map 86 includes both accurate depth boundaries and depth values for each pixel.

Turning back to FIG. 14, step 1114 may include a second set of substeps 1120 and 1122 for generating the depth map based on the received image and the active brightness image. At substep 1120, the method 1100 may include, for each pixel in the received image, calculating support weights for each other pixel in a region of interest surrounding that pixel based on the generated active brightness image. The support weights may be calculated according to the method described with reference to FIGS. 16A and 16B. However, in the example second set of substeps, the method 1100 does not filter an already generated depth map using the calculated support weights during a postprocessing step. Rather, at substep 1122, the method 1100 may include performing stereo matching between the received image and a prerecorded image of the predetermined structured light pattern based on the regions of interest and calculated support weights for each pixel. That is, the processor 18 implementing substeps 1120 and 1122 of the example method 1100 use the support weights calculated at substep 1120 to improve the stereo matching between regions of interest in the received image and corresponding regions of interest in the prerecorded image. In the example received image 36D illustrated in FIG. 15A, the processor 18 implementing substeps 1120 and 1122 may be configured to apply supports weights for the region of interest R3 to dots of the predetermined structured light pattern contained in the region of interest R3. Similarly to the support weight calculated method described with reference to FIG. 16B, the support weights may be calculated based on a similarity in intensity value in the active brightness image. That is, pixels having a similar intensity value to the center pixel of interest of the region of interest are given a higher weighting, and pixels having a dissimilar intensity value to the center pixel of interest are given a lower weighting.

Thus, in the example illustrated in FIG. 15A, the lower two dots in the region of interest R3 will be given a higher weighting when searching for a matching region of interest in the prerecorded image 62 illustrated in FIG. 15B, and the dot in the upper right quadrant of the region of interest R3 will be given a lower weighting when searching for the matching region of interest. In this manner, the accuracy of the block/patch matching stereo algorithm may be improved at the edge/depth boundaries in the example received image 36D, and the processor 18 may generate the example depth map with accurate depth boundaries 68 directly from the support weight block matching stereo algorithm described above.

Figure 18:
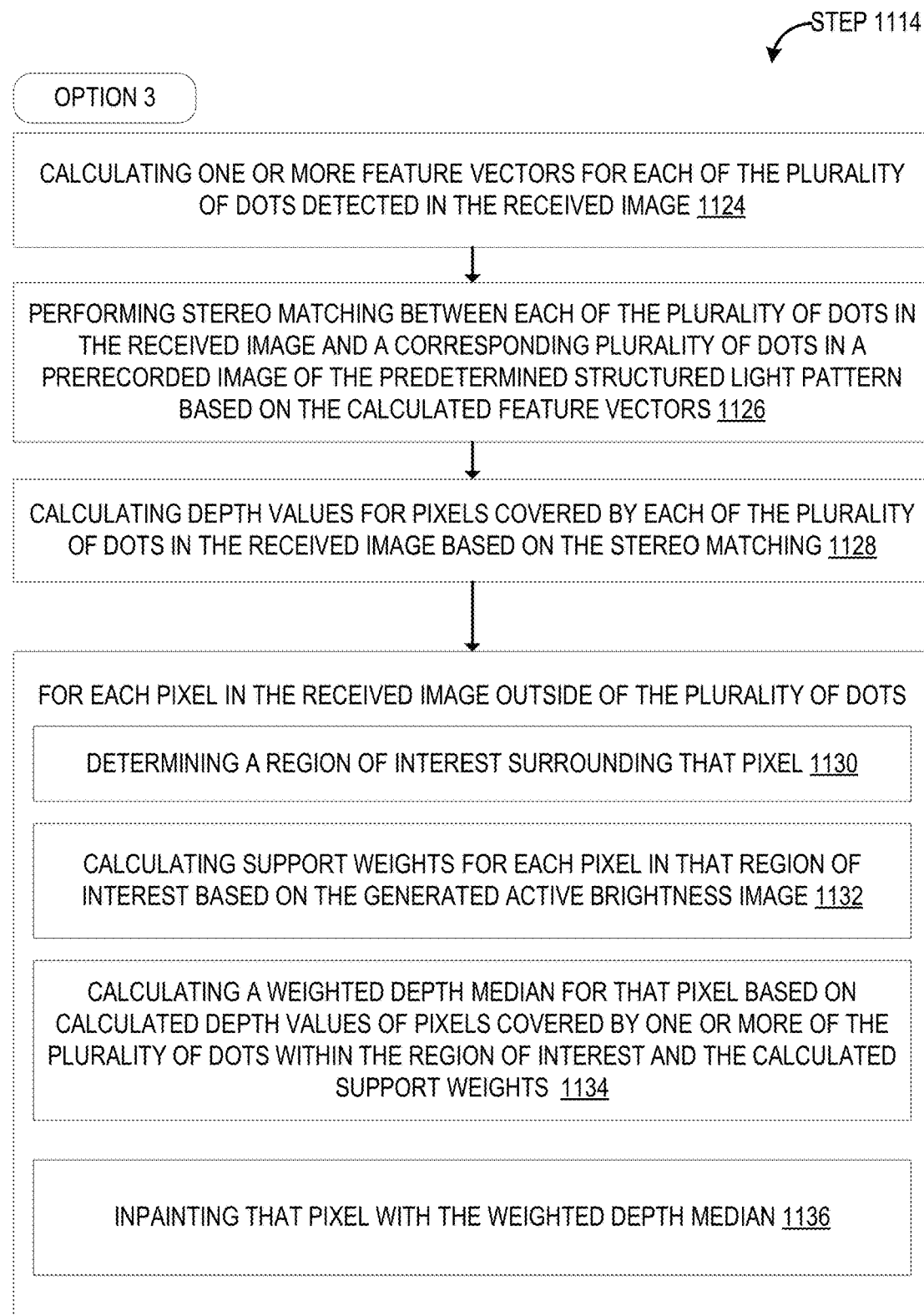
FIG. 18 continues the example method of FIG. 11.
Figure 19B:
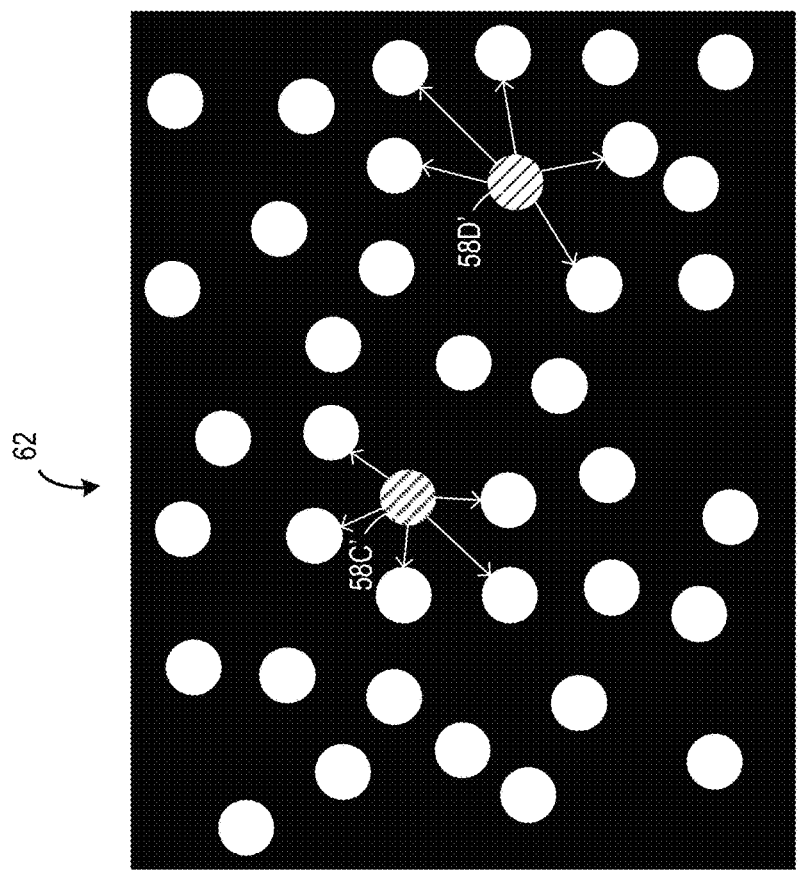
FIG. 19B shows an example prerecorded image for the predetermined structured light pattern for the depth sensor of the computing device of FIG. 1.
Figure 19A:
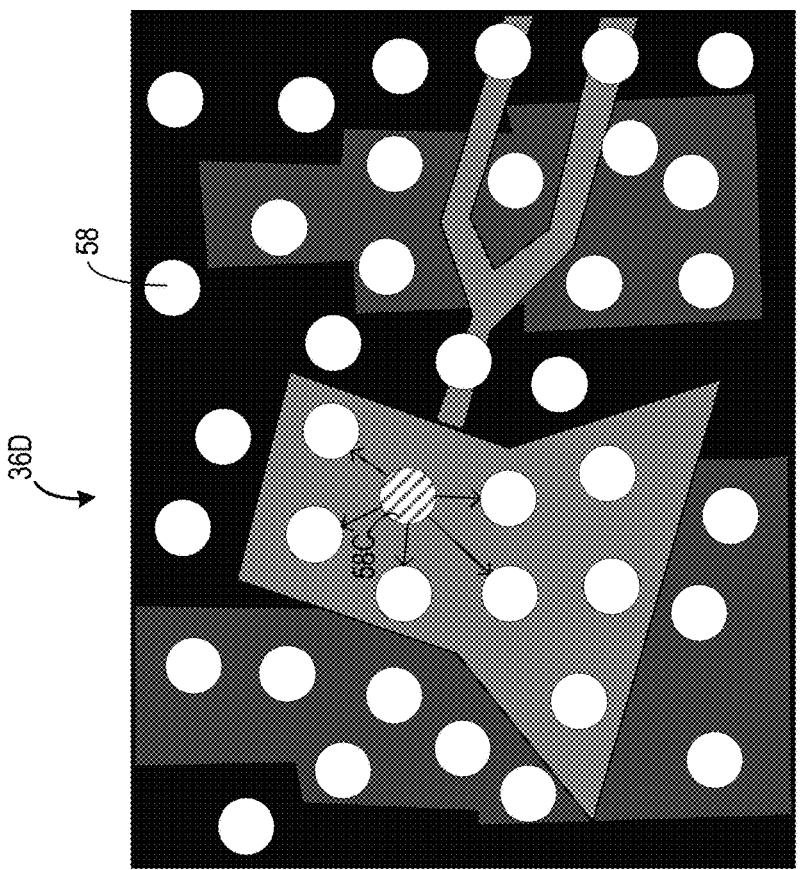
FIG. 19A shows an example image captured by the camera 24 of the depth sensor of the computing device of FIG. 1.

Turning to FIG. 18, step 1114 may include a third set of substeps 1124 through 1136 for generating the depth map based on the received image and the active brightness image. At substep 1124, the method 1100 may include calculating one or more feature vectors for each of the plurality of dots detected in the received image. In one example, the one or more feature vectors for each of the plurality of dots are calculated based on a pixel distance to another of the plurality of dots. In the example illustrated in FIG. 19A, five feature vectors are shown for the example dot 58C of the plurality of dots 58 of the example received image 36D. As illustrated, the processor 18 may calculate five feature vectors of the example dot 58C, which include vectors toward the nearest five other dots of the plurality of dots 58. To determine a corresponding dot in the example prerecorded image 62 illustrated in FIG. 19B, the processor 18 may be configured to search a stored table that includes feature vectors for each of the plurality of dots in the prerecorded image 62 to find a closest match. As the prerecorded image 62 is constant for all scene content, the feature vectors for each dot in the prerecorded image may be precomputed and stored in a lookup table in memory of the HMD device 12. That is, feature vectors indicating a pixel distance to the nearest five dots in the predetermined structured light pattern 26 in the example prerecorded image 62 may be precomputed for each dot, as shown for prerecorded dots 58C' and 58D' in FIG. 19B. It will be appreciated that the above example feature vectors are merely exemplary, and that the processor 18 may be configured to calculate any suitable type of feature vector to characterize each dot in the predetermined structured light pattern 26.

At substep 1126, the method 1100 may include performing stereo matching between each of the plurality of dots in the received image and a corresponding plurality of dots in a prerecorded image of the predetermined structured light pattern based on the calculated feature vectors. As discussed above, the processor 18 may determine stereo matches between dots in the example received image 36D of FIG. 19A and dots in the example prerecorded image 62 of FIG. 19B by calculating one or more feature vectors for each dot in the example received image 36D, and searching a precomputed lookup table for a corresponding dot in the example prerecorded image 62 that has a matching or similar set of feature vectors.

At substep 1128, the method 1100 may include calculating depth values for pixels covered by each of the plurality of dots in the received image based on the stereo matching. After finding matching stereo pairs for each dot of the plurality of dots 58 in the example received image 36D, the processor 18 may be configured to calculate a depth value for each dot using the depth calculation method described with reference to FIG. 2C. The processor 18 may be further configured to inpaint the calculated depth value to each pixel in the example received image 36D corresponding to that dot of the predetermined structured light pattern 26. In this manner, the processor 18 generates a sparse depth map that includes depth values for the pixels corresponding to each of the plurality of dots 58 in the received image, such as, for example, the example sparse depth map 70 illustrated in FIG. 20. However, the example sparse depth map 70 does not include depth values for pixels outside of the plurality of dots 58.

Thus, at substep 1130, the method 1100 may include, for each pixel in the received image outside of the plurality of dots, determining a region of interest surrounding that pixel. The processor 18 may be configured to determine the regions of interest surround each pixel according to the methods described with reference to FIG. 15A. In the example illustrated in FIG. 20, the processor 18 determined an example region of interest R6 centered at the example pixel P6. Similar regions of interest may be determined for each pixel in the received image outside of the plurality of dots.

At substep 1132, the method 1100 may include calculating support weights for each pixel in that region of interest based on the generated active brightness image. The processor 18 may be configured to calculated support weights according to the methods described with reference to FIG. 16B. In the example illustrated in FIG. 20, the example pixel P6 lies on the lamp object depth plane. Thus, the other pixels in the example region of interest R6 that lie on the same depth plane as the example pixel P6 will receive a higher support weight value, and the other pixels in the example region of interest R6 that lie of a different depth plane will receive a lower support weight value.

At substep 1134, the method 1100 may include calculating a weighted depth median for that pixel based on calculated depth values of pixels covered by one or more of the plurality of dots within the region of interest and the calculated support weights. The processor 18 may be configured to calculated the weighted depth median according to the methods described with reference to FIG. 16A and FIG. 16B. However, in the example sparse depth map 70, pixels outside of each of the plurality of dots 58 may not have a calculated depth value yet. Thus, the processor 18 may be configured to calculate a weighted depth median based on the pixels covered by the dots that have a calculated depth value in the example sparse depth map 70.

Figure 20:
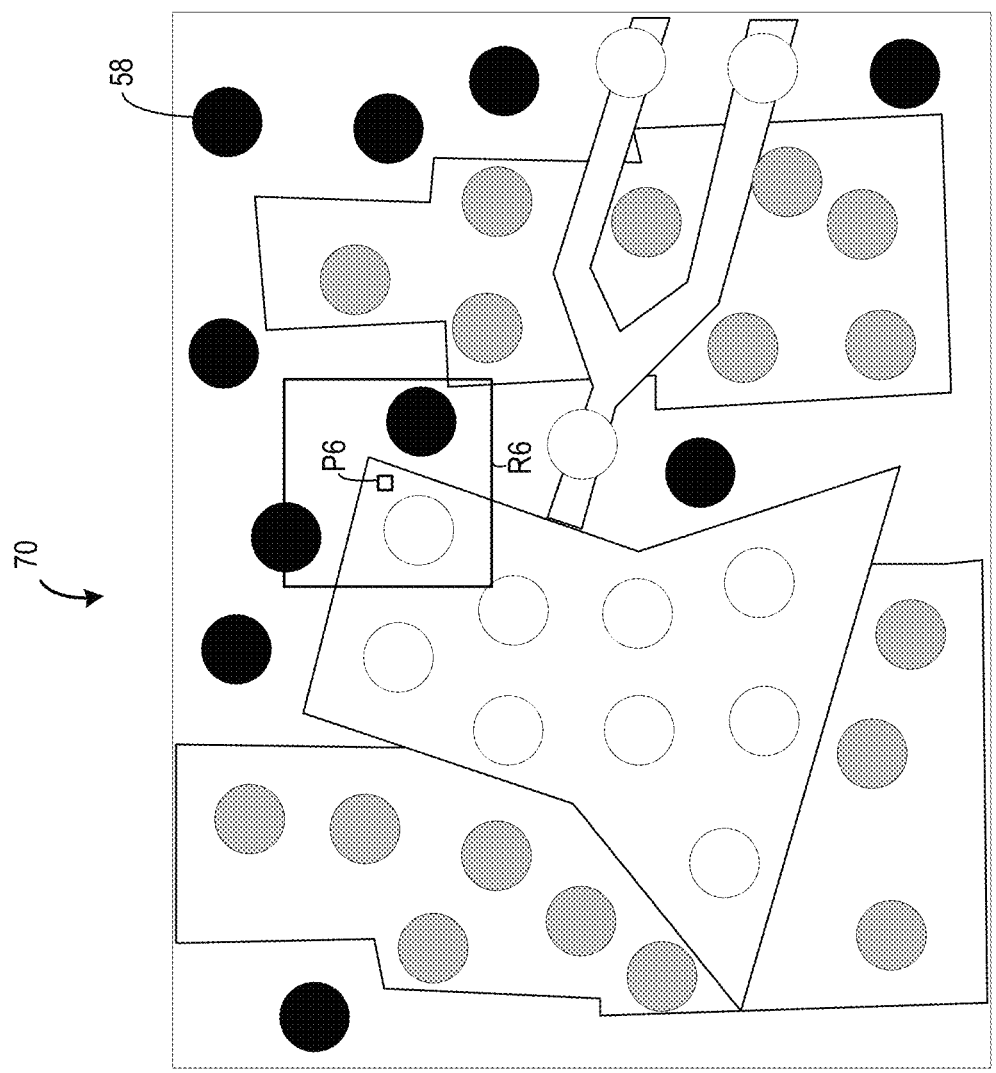
FIG. 20 shows an example sparse depth map for the example image captured by the depth sensor of the computing device of FIG. 1.

At step 1136, the method 1100 may include inpainting that pixel with the weighted depth median. The processor 18 may be configured to perform substeps 1130 through 1136 for each pixel in the sparse depth map 70 outside of the pixels corresponding to the plurality of dots 58, which are the imaged reflection of the emitted predetermined structured light pattern 26. In this manner, each pixel in the example sparse depth map 70 of FIG. 20 is inpainted with a suitable depth value, generating the example depth map with accurate depth boundaries 68 illustrated in FIG. 17.

In some embodiments, the methods and processes described herein may be tied to a computing system of one or more computing devices. In particular, such methods and processes may be implemented as a computer-application program or service, an application-programming interface (API), a library, and/or other computer-program product.

Figure 21:
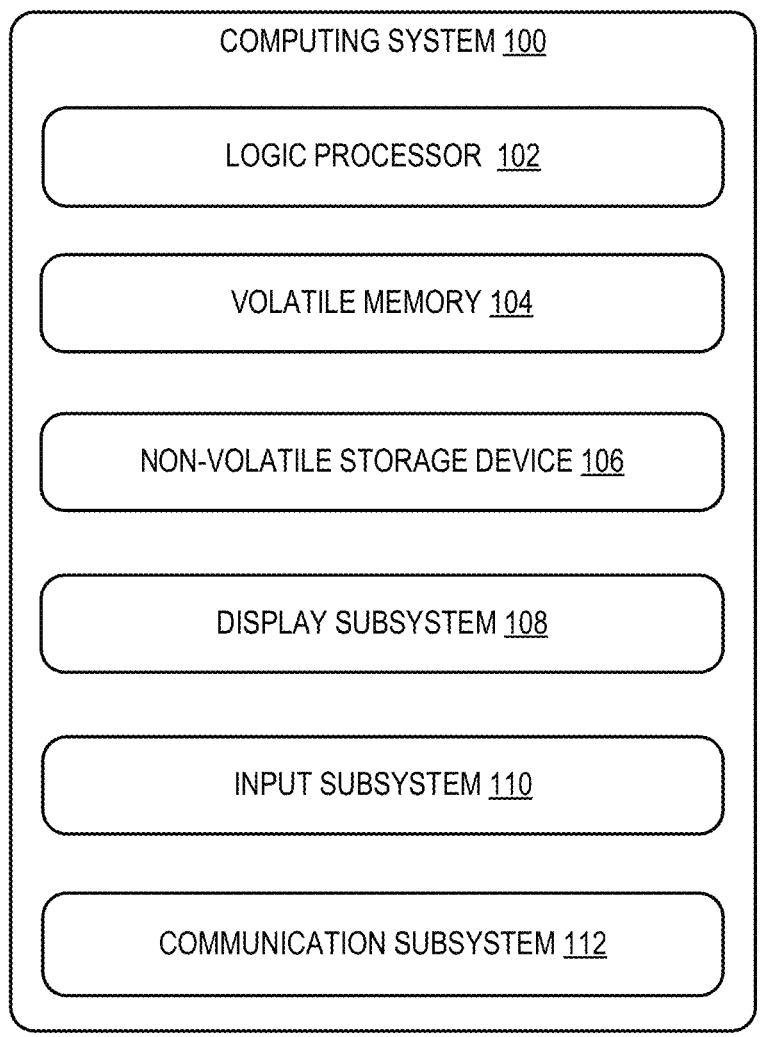
FIG. 21 shows an example computing system according to an embodiment of the present description.

FIG. 21 schematically shows a non-limiting embodiment of a computing system 100 that can enact one or more of the methods and processes described above. Computing system 100 is shown in simplified form. Computing system 100 may embody the computing device 10 and HMD device 12 of FIG. 1. Computing system 100 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 100 includes a logic processor 102, volatile memory 104, and a non-volatile storage device 106. Computing system 1000 may optionally include a display subsystem 108, input subsystem 110, communication subsystem 112, and/or other components not shown in FIG. 21.

Logic processor 102 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 102 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 106 includes one or more physical devices configured to hold instructions executable by the logic processors to implement the methods and processes described herein. When such methods and processes are implemented, the state of non-volatile storage device 106 may be transformed—e.g., to hold different data.

Non-volatile storage device 106 may include physical devices that are removable and/or built-in. Non-volatile storage device 106 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 106 may include nonvolatile, dynamic, static, read/write, read-only, sequential-access, location-addressable, file-addressable, and/or content-addressable devices. It will be appreciated that non-volatile storage device 106 is configured to hold instructions even when power is cut to the non-volatile storage device 106.

Volatile memory 104 may include physical devices that include random access memory. Volatile memory 104 is typically utilized by logic processor 102 to temporarily store information during processing of software instructions. It will be appreciated that volatile memory 104 typically does not continue to store instructions when power is cut to the volatile memory 104.

Aspects of logic processor 102, volatile memory 104, and non-volatile storage device 106 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 100 typically implemented in software by a processor to perform a particular function using portions of volatile memory, which function involves transformative processing that specially configures the processor to perform the function. Thus, a module, program, or engine may be instantiated via logic processor 102 executing instructions held by non-volatile storage device 106, using portions of volatile memory 104. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 108 may be used to present a visual representation of data held by non-volatile storage device 106. The visual representation may take the form of a graphical user interface (GUI). As the herein described methods and processes change the data held by the non-volatile storage device, and thus transform the state of the non-volatile storage device, the state of display subsystem 108 may likewise be transformed to visually represent changes in the underlying data. Display subsystem 108 may include one or more display devices utilizing virtually any type of technology. Such display devices may be combined with logic processor 102, volatile memory 104, and/or non-volatile storage device 1006 in a shared enclosure, or such display devices may be peripheral display devices.

When included, input subsystem 110 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, inertial measurement unit, and/or gyroscope for motion detection and/or intent recognition; as well as electric-field sensing componentry for assessing brain activity; and/or any other suitable sensor.

When included, communication subsystem 112 may be configured to communicatively couple various computing devices described herein with each other, and with other devices. Communication subsystem 1012 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1000 to send and/or receive messages to and/or from other devices via a network such as the Internet.

The following paragraphs provide additional support for the claims of the subject application. One aspect provides a method comprising receiving an image of a scene illuminated by both a predetermined structured light pattern and a flood fill illumination, generating an active brightness image of the scene based on the received image of the scene including detecting a plurality of dots of the predetermined structured light pattern, and removing the plurality of dots of the predetermined structured light pattern from the active brightness image, and generating a depth map of the scene based on the received image and the active brightness image. In this aspect, additionally or alternatively, removing the plurality of dots may further include, for each of the plurality of dots of the predetermined structured light pattern, inpainting pixels corresponding to that dot with an intensity value. In this aspect, additionally or alternatively, inpainting pixels may include sampling the intensity value from a pixel in the image outside of that dot. In this aspect, additionally or alternatively, the intensity value may be sampled from a next closest pixel outside of that dot. In this aspect, additionally or alternatively, generating the depth map of the scene may include performing stereo matching between the received image and a prerecorded image of the predetermined structured light pattern. In this aspect, additionally or alternatively, the method may further comprise filtering the generated depth map of the scene based on the generated active brightness image. In this aspect, additionally or alternatively, generating the depth map of the scene may include, for each pixel in the received image, calculating support weights for each other pixel in a region of interest surrounding that pixel based on the generated active brightness image, and performing stereo matching between the received image and a prerecorded image of the predetermined structured light pattern based on the regions of interest and calculated support weights for each pixel. In this aspect, additionally or alternatively, the support weights may be calculated based on a similarity in intensity value in the active brightness image. In this aspect, additionally or alternatively, generating the depth map of the scene may include calculating one or more feature vectors for each of the plurality of dots detected in the received image, performing stereo matching between each of the plurality of dots in the received image and a corresponding plurality of dots in a prerecorded image of the predetermined structured light pattern based on the calculated feature vectors, calculating depth values for pixels covered by each of the plurality of dots in the received image based on the stereo matching, for each pixel in the received image outside of the plurality of dots, determining a region of interest surrounding that pixel, calculating support weights for each pixel in that region of interest based on the generated active brightness image, calculating a weighted depth median for that pixel based on calculated depth values of pixels covered by one or more of the plurality of dots within the region of interest and the calculated support weights, and inpainting that pixel with the weighted depth median. In this aspect, additionally or alternatively, the one or more feature vectors for each of the plurality of dots may be calculated based on a pixel distance to another of the plurality of dots.

Another aspect provides a computing device comprising an illuminator configured to emit both a predetermined structured light pattern and a flood fill illumination on a scene, a camera configured to capture an image of the scene illuminated by the predetermined structured light pattern and the flood fill illumination, and a processor configured to generate an active brightness image of the scene based on the captured image of the scene, including detect a plurality of dots of the predetermined structured light pattern, and remove the plurality of dots of the predetermined structured light pattern from the active brightness image, and generate a depth map of the scene based on the captured image and the active brightness image. In this aspect, additionally or alternatively, to remove the plurality of dots, the processor may be further configured to, for each of the plurality of dots of the predetermined structured light pattern, inpaint pixels corresponding to that dot with an intensity value. In this aspect, additionally or alternatively, to inpaint pixels, the processor may be further configured to sample the intensity value from a pixel in the image outside of that dot. In this aspect, additionally or alternatively, the intensity value may be sampled from a next closest pixel outside of that dot. In this aspect, additionally or alternatively, to generate the depth map of the scene, the processor may be further configured to perform stereo matching between the captured image and a prerecorded image of the predetermined structured light pattern. In this aspect, additionally or alternatively, the processor may be further configured to filter the generated depth map of the scene based on the generated active brightness image. In this aspect, additionally or alternatively, to generate the depth map of the scene, the processor may be further configured to for each pixel in the captured image, calculate support weights for each other pixel in a region of interest surrounding that pixel based on the generated active brightness image, and perform stereo matching between the captured image and a prerecorded image of the predetermined structured light pattern based on the regions of interest and calculated support weights for each pixel. In this aspect, additionally or alternatively, the support weights may be calculated based on a similarity in intensity value in the active brightness image. In this aspect, additionally or alternatively, to generate the depth map of the scene, the processor may be further configured to calculate one or more feature vectors for each of the plurality of dots detected in the captured image, perform stereo matching between each of the plurality of dots in the captured image and a corresponding plurality of dots in a prerecorded image of the predetermined structured light pattern based on the calculated feature vectors, calculate depth values for pixels covered by each of the plurality of dots in the captured image based on the stereo matching, for each pixel in the captured image outside of the plurality of dots determine a region of interest surrounding that pixel, calculate support weights for each pixel in that region of interest based on the generated active brightness image, calculate a weighted depth median for that pixel based on calculated depth values of pixels covered by one or more of the plurality of dots within the region of interest and the calculated support weights, and inpaint that pixel with the weighted depth median.

Another aspect provides a method comprising emitting both a predetermined structured light pattern and a flood fill illumination on a scene, capturing an image of the scene illuminated by the predetermined structured light pattern and the flood fill illumination, generating an active brightness image of the scene based on the captured image of the scene including detecting a plurality of dots of the predetermined structured light pattern, and for each of the plurality of dots of the predetermined structured light pattern, inpainting pixels corresponding to that dot with an intensity value, and generating a depth map of the scene based on the captured image and the active brightness image.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method comprising:
    emitting a predetermined structured light pattern and a flood fill illumination in a predetermined band of the infrared light spectrum;
    receiving an image of a scene illuminated by both the predetermined structured light pattern and the flood fill illumination, the image being filtered to remove light outside of the predetermined band of the infrared light spectrum;
    generating an active brightness image of the scene based on the received image of the scene, wherein generating the active brightness image includes:
        detecting a plurality of dots of the predetermined structured light pattern within a data representation of the received image; and
        removing the plurality of dots of the predetermined structured light pattern detected within the data representation of the received image to obtain the active brightness image;
    determining a region of interest surrounding a pixel and a corresponding region of interest surrounding a corresponding pixel in the generated active brightness image;
    calculating a support weight for at least one other pixel in the determined region of interest surrounding the pixel based on a similarity in intensity value between the corresponding pixel and at least one other pixel in the corresponding region of interest in the generated active brightness image; and
    generating a depth map of the scene based on the received image, a prerecorded image of the predetermined structured light pattern, and the support weight calculated based on the active brightness image.

2. The method of claim 1, wherein removing the plurality of dots further includes, for each of the plurality of dots of the predetermined structured light pattern, inpainting pixels corresponding to that dot with an intensity value.

3. The method of claim 2, wherein inpainting pixels includes sampling the intensity value from a pixel in the image outside of that dot.

4. The method of claim 3, wherein the intensity value is sampled from a next closest pixel outside of that dot.

5. The method of claim 1, wherein generating the depth map of the scene includes performing stereo matching between the received image and the prerecorded image of the predetermined structured light pattern.

6. The method of claim 5, further comprising filtering the generated depth map of the scene based on the generated active brightness image.

7. The method of claim 1, wherein generating the depth map of the scene includes:
performing stereo matching between the received image and the prerecorded image of the predetermined structured light pattern based on the determined region of interest and calculated support weight.

8. The method of claim 1, wherein generating the depth map of the scene includes:
calculating one or more feature vectors for each of the plurality of dots detected in the received image;
performing stereo matching between each of the plurality of dots in the received image and a corresponding plurality of dots in the prerecorded image of the predetermined structured light pattern based on the calculated feature vectors;
calculating depth values for pixels covered by each of the plurality of dots in the received image based on the stereo matching;
for each pixel in the received image outside of the plurality of dots:
determining a region of interest surrounding that pixel;
calculating support weights for each pixel in that region of interest based on the generated active brightness image;
calculating a weighted depth median for that pixel based on calculated depth values of pixels covered by one or more of the plurality of dots within the region of interest and the calculated support weights; and
inpainting that pixel with the weighted depth median.

9. The method of claim 8, wherein the one or more feature vectors for each of the plurality of dots are calculated based on a pixel distance to another of the plurality of dots.

10. A computing device comprising:
an illuminator configured to emit both a predetermined structured light pattern and a flood fill illumination in a predetermined band of the infrared light spectrum on a scene;
a camera configured to capture an image of the scene illuminated by the predetermined structured light pattern and the flood fill illumination, the image being filtered to remove light outside of the predetermined band of the infrared light spectrum; and
a processor configured to:
generate an active brightness image of the scene based on the captured image of the scene, wherein to generate the active brightness image, the processor is configured to:
detect a plurality of dots of the predetermined structured light pattern within a data representation of the captured image; and
remove the plurality of dots of the predetermined structured light pattern detected within the data representation of the captured image to obtain the active brightness image;
determine a region of interest surrounding a pixel and a corresponding region of interest surrounding a corresponding pixel in the generated active brightness image;
calculate a support weight for at least one other pixel in the determined region of interest surrounding the pixel based on a similarity in intensity value between the corresponding pixel and at least one other pixel in the corresponding region of interest in the generated active brightness image; and
generate a depth map of the scene based on the captured image, a prerecorded image of the predetermined structured light pattern, and the support weight calculated based on the active brightness image.

11. The computing device of claim 10, wherein to remove the plurality of dots, the processor is further configured to, for each of the plurality of dots of the predetermined structured light pattern, inpaint pixels corresponding to that dot with an intensity value.

12. The computing device of claim 11, wherein to inpaint pixels, the processor is further configured to sample the intensity value from a pixel in the image outside of that dot.

13. The computing device of claim 12, wherein the intensity value is sampled from a next closest pixel outside of that dot.

14. The computing device of claim 10, wherein to generate the depth map of the scene, the processor is further configured to perform stereo matching between the captured image and the prerecorded image of the predetermined structured light pattern.

15. The computing device of claim 14, wherein the processor is further configured to filter the generated depth map of the scene based on the generated active brightness image.

16. The computing device of claim 10, wherein to generate the depth map of the scene, the processor is further configured to:
perform stereo matching between the captured image and the prerecorded image of the predetermined structured light pattern based on the determined region of interest and calculated support weight.

17. The computing device of claim 10, wherein to generate the depth map of the scene, the processor is further configured to:
calculate one or more feature vectors for each of the plurality of dots detected in the captured image;
perform stereo matching between each of the plurality of dots in the captured image and a corresponding plurality of dots in the prerecorded image of the predetermined structured light pattern based on the calculated feature vectors;
calculate depth values for pixels covered by each of the plurality of dots in the captured image based on the stereo matching;
for each pixel in the captured image outside of the plurality of dots:
determine a region of interest surrounding that pixel;
calculate support weights for each pixel in that region of interest based on the generated active brightness image;
calculate a weighted depth median for that pixel based on calculated depth values of pixels covered by one or more of the plurality of dots within the region of interest and the calculated support weights; and
inpaint that pixel with the weighted depth median.

18. A method comprising:
capturing two or more images of a scene, the two or more images including a structured light image that includes intensity data for the scene illuminated by a predetermined structured light pattern, and an active brightness image that includes intensity data for the scene illuminated by a flood fill illumination;
determining a region of interest surrounding a pixel and a corresponding region of interest surrounding a corresponding pixel in the captured active brightness image;

calculating a support weight for at least one other pixel in the determined region of interest surrounding the pixel based on a similarity in intensity value between the corresponding pixel and at least one other pixel in the corresponding region of interest in the generated active brightness image; and generating a depth map of the scene based on the captured structured light image, a prerecorded image of the predetermined structured light pattern, and the support weight calculated based on the active brightness image.

* * * * *